United States Patent
Kusashima et al.

(10) Patent No.: US 11,595,112 B2
(45) Date of Patent: Feb. 28, 2023

(54) COMMUNICATION DEVICE, METHOD, AND PROGRAM

(71) Applicant: Sony Corporation, Tokyo (JP)

(72) Inventors: Naoki Kusashima, Kanagawa (JP); Shinichiro Tsuda, Kanagawa (JP); Hiromasa Uchiyama, Tokyo (JP); Yifu Tang, Kanagawa (JP)

(73) Assignee: Sony Corporation, Tokyo (JP)

( * ) Notice: Subject to any disclaimer, the term of this patent is extended or adjusted under 35 U.S.C. 154(b) by 16 days.

(21) Appl. No.: 17/042,810

(22) PCT Filed: Mar. 15, 2019

(86) PCT No.: PCT/JP2019/010867
§ 371 (c)(1),
(2) Date: Sep. 28, 2020

(87) PCT Pub. No.: WO2019/193954
PCT Pub. Date: Oct. 10, 2019

(65) Prior Publication Data
US 2021/0021333 A1 Jan. 21, 2021

(30) Foreign Application Priority Data
Apr. 5, 2018 (JP) .............................. JP2018-072967

(51) Int. Cl.
*H04W 52/24* (2009.01)
*H04B 7/185* (2006.01)
(Continued)

(52) U.S. Cl.
CPC ....... *H04B 7/18506* (2013.01); *H04L 5/0032* (2013.01); *H04W 52/242* (2013.01); *H04W 52/243* (2013.01); *H04W 72/048* (2013.01)

(58) Field of Classification Search
CPC .............. H04B 7/18506; H04B 7/0617; H04B 17/336; H04B 7/0695; H04W 16/28;
(Continued)

(56) References Cited

U.S. PATENT DOCUMENTS

2013/0182790 A1  7/2013  Jalali et al.
2018/0359710 A1*  12/2018  Desclos ................ H04W 52/42
(Continued)

FOREIGN PATENT DOCUMENTS

EP    3 419 197 A1    12/2018
JP    2015-501096 A    1/2015
(Continued)

OTHER PUBLICATIONS

International Search Report and English translation thereof dated Jun. 11, 2019 in connection with International Application No. PCT/JP2019/010867.
(Continued)

*Primary Examiner* — Tu X Nguyen
(74) *Attorney, Agent, or Firm* — Wolf, Greenfield & Sacks, P.C.

(57) ABSTRACT

To provide a communication device capable of further improving the quality between wireless links in a communication system in which a base station device and a communication device communicate with each other.
Provided is a communication device configured to be capable of floating in the air, the communication device including a control unit that receives information regarding interference with a first communication device from a second communication device, the first communication device being not a communication partner, the second communication device being the communication partner, and controls transmission on the basis of the information regarding the interference and of an altitude of the communication device.

10 Claims, 15 Drawing Sheets

(51) Int. Cl.
 H04L 5/00 (2006.01)
 H04W 72/04 (2023.01)
(58) Field of Classification Search
 CPC ............ H04W 52/243; H04W 52/146; H04W
 52/367; H04W 52/24; H04W 56/0015;
 H04W 84/06
 See application file for complete search history.

(56) References Cited

U.S. PATENT DOCUMENTS

| 2019/0077508 A1 | 3/2019 | Shimezawa et al. | |
| 2020/0100187 A1* | 3/2020 | Balasubramanian | ........................ B64C 39/024 |
| 2020/0145963 A1* | 5/2020 | Balasubramanian | ........................ H04L 5/0037 |

FOREIGN PATENT DOCUMENTS

| WO | WO 2013/056136 A1 | 4/2013 |
| WO | WO 2018/042927 A1 | 3/2018 |

OTHER PUBLICATIONS

[No Author Listed], New WID on Enhanced LTE Support for Aerial Vehicles. Ericsson. 3GPP TSG RAN Meeting #78 RP-172826. Dec. 18-21, 2017. 4 pages.

[No Author Listed], Study on NR to support Non-Terrestrial Networks. Thales et al. 3GPP TSG RAN Meeting #75 RP-170717. Mar. 6-9, 2017. 5 pages.

"3rd Generation Partnership Project; Technical Specification Group Radio AccessNetwork; Study on Enhanced LTE Support for Aerial Vehicles (Release 15)",3GPP Standard; Technical Report; 3GPP TR 36.777, 3rd Generation Partnership Project (3GPP), Mobile Competence Centre ; 650,Route Des Lucioles ; F-06921 Sophia-Antipolis Cedex ; France,vol. RAN WG2, No. V15.0.0, Jan. 6, 2018 (Jan. 6, 2018), pp. 1-89,XP051392400,[retrieved on Jan. 6, 2018].

Huawei et al: "Interference Detection for Drones", 3GPP Draft; R2-1710405 Interference Detection for Drones, 3rd Generation Partnership Project (3GPP), Mobile Competence Centre ; 650, Route Des Lucioles ; F-06921 Sophia-Antipolis Cedex ; France ,vol. RAN WG2, No. Prague, Czech Republic; Oct. 9, 2017-Oct. 13, 2017 Oct. 8, 2017 (Oct. 8, 2017), XP051342450,Retrieved from the Internet:URL:http ://www.3gpp.org/ftp/Meeti ngs_3GPP SYNC/RAN2/Docs/[retrieved on Oct. 8, 2017].

Huawei et al: "Potential UL enhancements for drones", 3GPP Draft; RI-1716966, 3rd Generation Partnership Project (3GPP), Mobile Competence Centre ; 650, Route Des Lucioles ; F-06921 Sophia-Antipolis Cedex; France vol. RAN WG1, No. Prague, Czech Republic;Oct. 9, 2017-Oct. 13, 2017 Sep. 29, 2017 (Sep. 29, 2017), XP051351484, Retrieved from the Internet: URL:http://www.3gpp.org/ftp/tsg ran/WGI RL I/TSGRI_90b/Docs/[retrieved on Sep. 29, 2017].

Huawei et al: "UL enhancements for drones",3GPP Draft; RI-1720110, 3rd Generation Partnership Project (3GPP), Mobile Competence Centre ; 650, Route Des Lucioles ; F-06921 Sophia-Antipolis Cedex ; France vol. RAN WG1, No. Reno, USA; Nov. 27, 2017-Dec. 1, 2017 Nov. 17, 2017 (Nov. 17, 2017), XP051369223,Retrieved from the Internet: URL: http://www.3gpp.org/ftp/tsg%5Fran/WG1%5FRLI/TSGRI%5F91/Docs/[retrieved on Nov. 17, 2017].

Sequans Communications: "Uplink Interference Mitigation for Aerial Vehicles",3GPP Draft; RI-1718297 Uplink Interference Mitigation for Aerial Vehicles, 3rd Generation Partnership Project (3GPP), Mobile Competence Centre ; 650, Route Des Lucioles ; F-06921 Sophia-Antipoli s Cede vol. RAN WG1, No. Prague, CZ; Oct. 9, 2017-Oct. 13, 2017 Sep. 29, 2017 (Sep. 29, 2017),XP051351676,Retrieved from the Internet:URL:http://www.3gpp.org/ftp/tsg ran/WGI RLI/TSGRI_90b/Docs/ [retrieved on Sep. 29, 2017].

* cited by examiner

COMMUNICATION DEVICE, METHOD, AND PROGRAM

CROSS-REFERENCE TO RELATED APPLICATIONS

This application claims the benefit under 35 U.S.C. § 371 as a U.S. National Stage Entry of International Application No. PCT/JP2019/010867, filed in the Japanese Patent Office as a Receiving Office on Mar. 15, 2019, which claims priority to Japanese Patent Application Number JP2018-072967, filed in the Japanese Patent Office on Apr. 5, 2018, each of which is hereby incorporated by reference in its entirety.

TECHNICAL FIELD

The present disclosure relates to a communication device, a method, and a program.

BACKGROUND ART

Wireless access schemes and wireless networks for cellular mobile communication (hereinafter also referred to as "long term evolution (LTE)", "LTE-advanced (LTE-A)", "LTE-advanced pro (LTE-A Pro)", "new radio (NR)", "new radio access technology (NRAT)", "evolved universal terrestrial radio access (EUTRA)", or "further EUTRA (FEUTRA)") are under study in the 3rd generation partnership project (3GPP). Note that LTE includes LTE-A, LTE-A Pro, and EUTRA, and NR includes NRAT and FEUTRA in the following description. In LTE, a base station device (base station) is also referred to as an evolved Node B (eNodeB); in NR, a base station device (base station) is also referred to as gNodeB; and in LTE and NR, a terminal device (mobile station, mobile station device, or terminal) is also referred to as user equipment (UE). LTE and NR are cellular communication systems in which a plurality of areas covered by a base station device is arranged in cells. A single base station device may manage a plurality of cells.

Studies on cellular communication in LTE and NR for aerial vehicles such as drones have been started, aiming at providing services from a terrestrial cellular network to aerial vehicles. It is known that communication for aerial vehicles has problems about inter-cell interference and mobility because propagation environments in the sky are different from propagation environments on the ground. Details of cellular communication for aerial vehicles in LTE and NR are disclosed in Non-Patent Documents 1 and 2.

CITATION LIST

Non-Patent Document

Non-Patent Document 1: RP-172826, "New WID on Enhanced LTE Support for Aerial Vehicles," 3GPP TSG RAN Meeting #78, Lisbon, Portugal, Dec. 18-21, 2017.
Non-Patent Document 2: RP-170717, "Study on NR to support Non-Terrestrial Networks," 3GPP TSG RAN Meeting #75, Dubrovnik, Croatia, Mar. 6-9, 2017.

SUMMARY OF THE INVENTION

Problems to be Solved by the Invention

An uplink signal transmitted by a communication device floating in the air gives a great amount of inter-cell interference to a large number of surrounding cells, posing difficulty in stable communication.

Therefore, the present disclosure proposes a novel and improved communication device, method, and program capable of further improving the quality between wireless links in a communication system in which a base station device and a communication device communicate with each other.

Solutions to Problems

According to the present disclosure, there is provided a communication device configured to be capable of floating in the air, the communication device including a control unit that receives information regarding interference with a first communication device from a second communication device, the first communication device being not a communication partner, the second communication device being the communication partner, and controls transmission on the basis of the information regarding the interference and of an altitude of the communication device.

Furthermore, according to the present disclosure, there is provided a communication device including a communication unit that receives information regarding interference caused by a first communication device with a second communication device from the second communication device, the first communication device being a communication partner and being configured to be capable of floating, and transmits the information regarding the interference to the first communication device, in which the information regarding the interference includes information regarding a beamform resulting from the interference caused by the first communication device with the second communication device.

Furthermore, according to the present disclosure, there is provided a communication control method for a communication device configured to be capable of floating in the air, the communication control method including: receiving information regarding interference with a first communication device from a second communication device, the first communication device being not a communication partner, the second communication device being the communication partner; and controlling transmission on the basis of the information regarding the interference and of an altitude of the communication device.

Furthermore, according to the present disclosure, there is provided a communication control method including: receiving information regarding interference caused by a first communication device with a second communication device from the second communication device, the first communication device being a communication partner and being configured to be capable of floating; and transmitting the information regarding the interference to the first communication device, in which the information regarding the interference includes information regarding a beamform resulting from the interference caused by the first communication device with the second communication device.

Furthermore, according to the present disclosure, there is provided a computer program executed on a communication device configured to be capable of floating in the air, the computer program causing to execute: receiving information regarding interference with a first communication device from a second communication device, the first communication device being not a communication partner, the second communication device being the communication partner;

and controlling transmission on the basis of the information regarding the interference and of an altitude of the communication device.

Furthermore, according to the present disclosure, there is provided a computer program causing a computer to execute: receiving information regarding interference caused by a first communication device with a second communication device from the second communication device, the first communication device being a communication partner and being configured to be capable of floating; and transmitting the information regarding the interference to the first communication device, in which the information regarding the interference includes information regarding a beamform resulting from the interference caused by the first communication device with the second communication device.

Effects of the Invention

As described above, the present disclosure makes it possible to provide a novel and improved communication device, method, and program capable of further improving the quality between wireless links in a communication system in which a base station device and a communication device communicate with each other.

Note that the effects described above are not necessarily limited, and any of the effects shown in the description or other effects that may be recognized from the description may be provided in addition to, or in place of, the effects described above.

MODE FOR CARRYING OUT THE INVENTION

Figure 1:
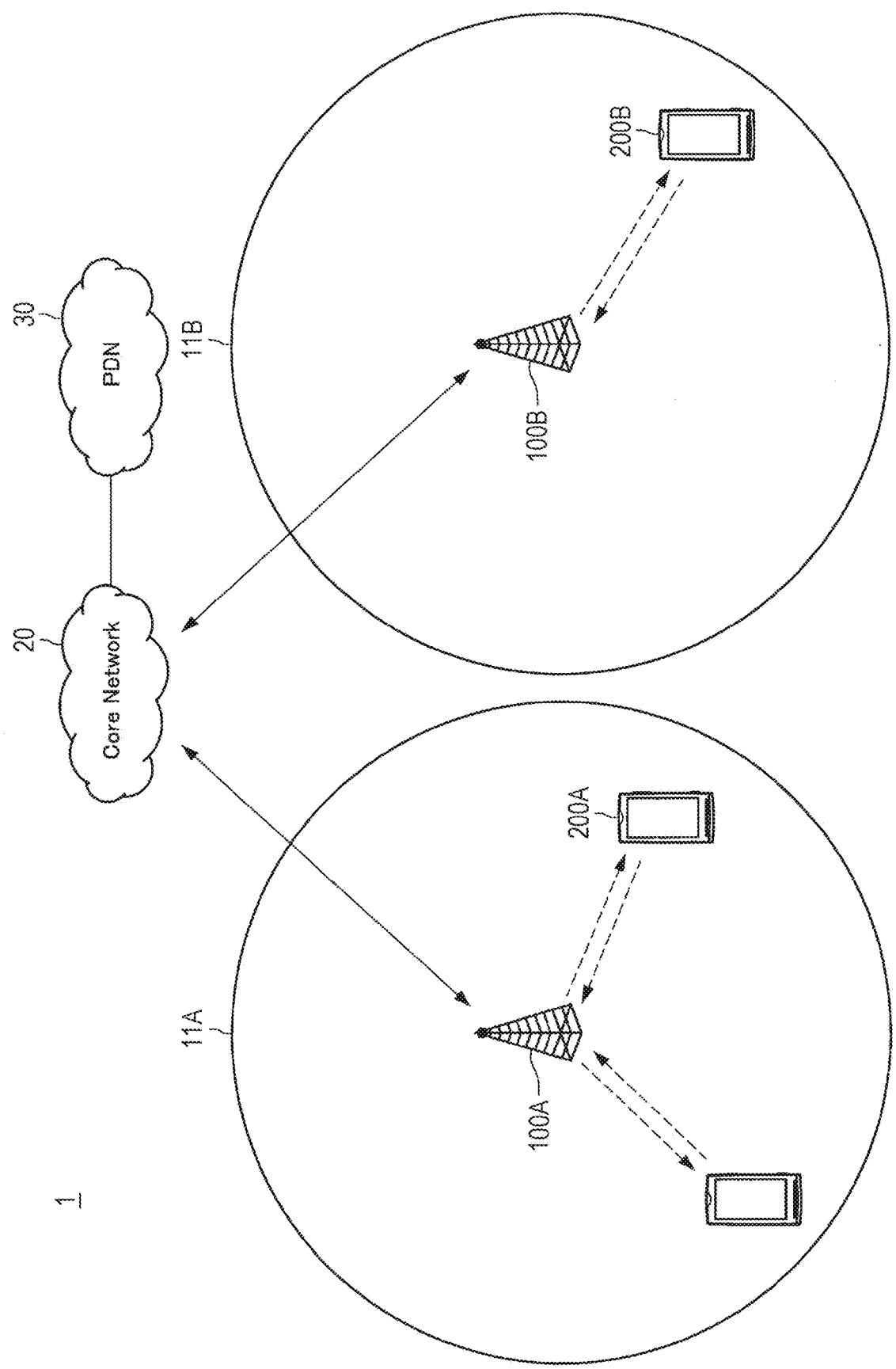
FIG. 1 is a diagram illustrating an example of an overall configuration of a system according to an embodiment of the present disclosure.

Preferred embodiments of the present disclosure will now be described in detail with reference to the accompanying drawings. Note that, in the description and the drawings, components having substantially the same functions and configurations are denoted by the same reference numerals and redundant descriptions are omitted. In addition, unless otherwise specified, the below-mentioned technologies, functions, methods, configurations, procedures, and all other descriptions can be applied to LTE and NR.

Note that descriptions will be provided in the order shown below.
1. Introduction
2. Configuration example
3. Drone
4. Technical features
5. Application example
6. Conclusion

1. INTRODUCTION 1.1. System Configuration Example

A base station device 100 operates a cell 11 (11A or 11B) and provides wireless services to one or more terminal devices located within the cell 11. For example, the base station device 100A provides wireless services to the terminal device 200A, and the base station device 100B provides wireless services to the terminal device 200B. The cell 11 may be operated in accordance with any wireless communication scheme such as, for example, LTE or new radio (NR). The base station device 100 is connected to a core network 20. The core network 20 is connected to a PDN 30.

The core network 20 may include a mobility management entity (MME), a serving gateway (S-GW), a PDN gateway (P-GW), a policy and charging rule function (PCRF), and a home subscriber server (HSS). Alternatively, the core network 20 may include an NR entity having functions similar to these functions. The MME, which is a control node handling control-plane signals, manages the moving state of a terminal device. The S-GW, which is a control node handling user-plane signals, is a gateway device that switches transfer paths for user data. The P-GW, which is a control node handling user-plane signals, is a gateway device serving as a connection point between the core network 20 and the PDN 30. The PCRF is a control node performing control related to policy and charging, such as quality of service (QoS) for a bearer. The HSS is a control node that handles subscriber data and performs service control.

The terminal device 200 wirelessly communicates with the base station device 100 on the basis of the control performed by the base station device 100. The terminal device 200 may be so-called user equipment (UE), or may be a relay station (relay terminal) used for transferring data to another terminal device 200. For example, the terminal device 200 transmits an uplink signal to the base station device 100 and receives a downlink signal from the base station device 100. Moreover, the terminal device 200 transmits a sidelink signal to another terminal device 200 and receives a sidelink signal from another terminal device 200.

Figure 2:
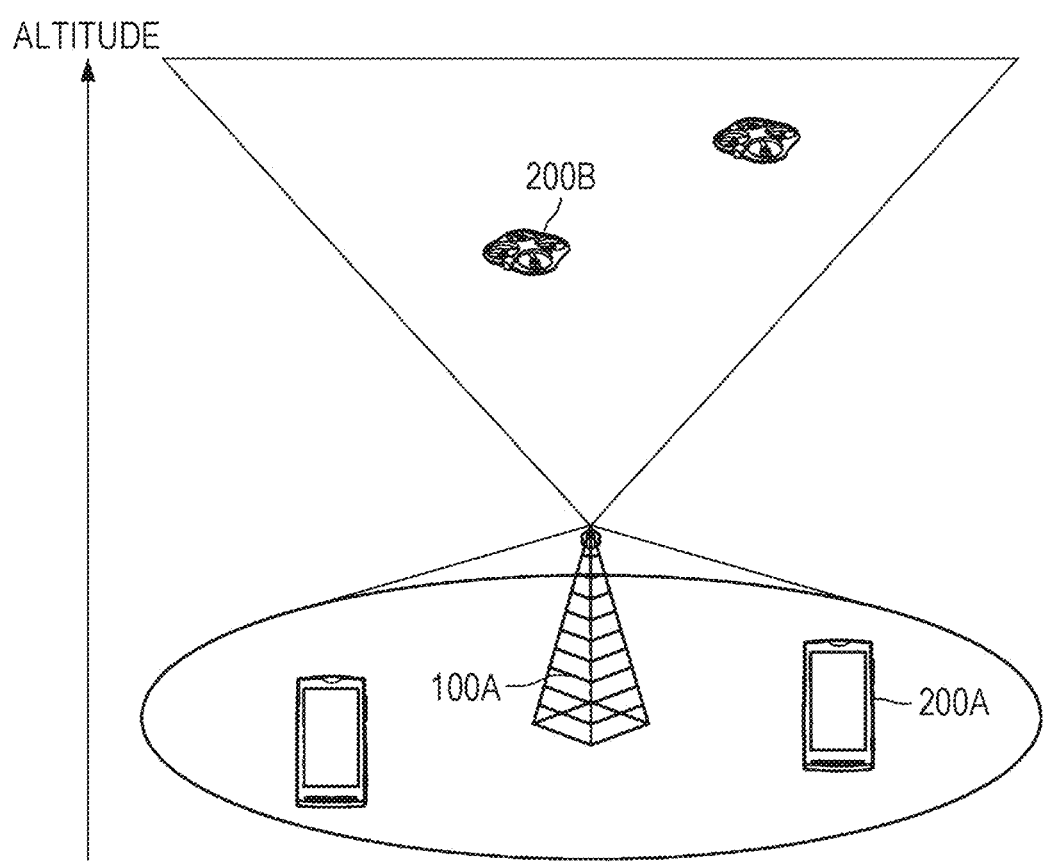
FIG. 2 is a diagram illustrating an example of a cellular network supporting aerial vehicles according to the present embodiment.

As illustrated in FIG. 2, the system of the present embodiment is capable of providing a cellular network not only to an ordinary terminal device present on the ground (terrestrial user equipment (UE)) but also to a terminal device floating in the air (hereinafter referred to as aerial user equipment (UE)). Examples of the aerial user equipment include a drone, a balloon, an airplane, and the like. The base station device is capable of forming a coverage in the air by emitting radio waves to the sky, as well as forming a coverage toward the ground.

1.2. Technical Problem

Since radio waves are emitted radially, the coverage closer to the base station device is narrower while the coverage farther away from the base station device is wider. In a case where the aerial user equipment floating in the air carries out communication at a high altitude, which is far from the base station device, the aerial user equipment transmits a signal to the connected cell and at the same time widely interferes with a plurality of surrounding cells, and therefore the reception quality may be deteriorated by inter-cell interference. Specifically, strong inter-cell interference occurs when a resource used for transmitting a synchronization signal and a reference signal (CRS, in particular) used for identifying a cell are commonly used between cells. The inter-cell interference may be a factor that causes significant deterioration of the reception quality of signals from the connected cell (serving cell).

Figure 3:
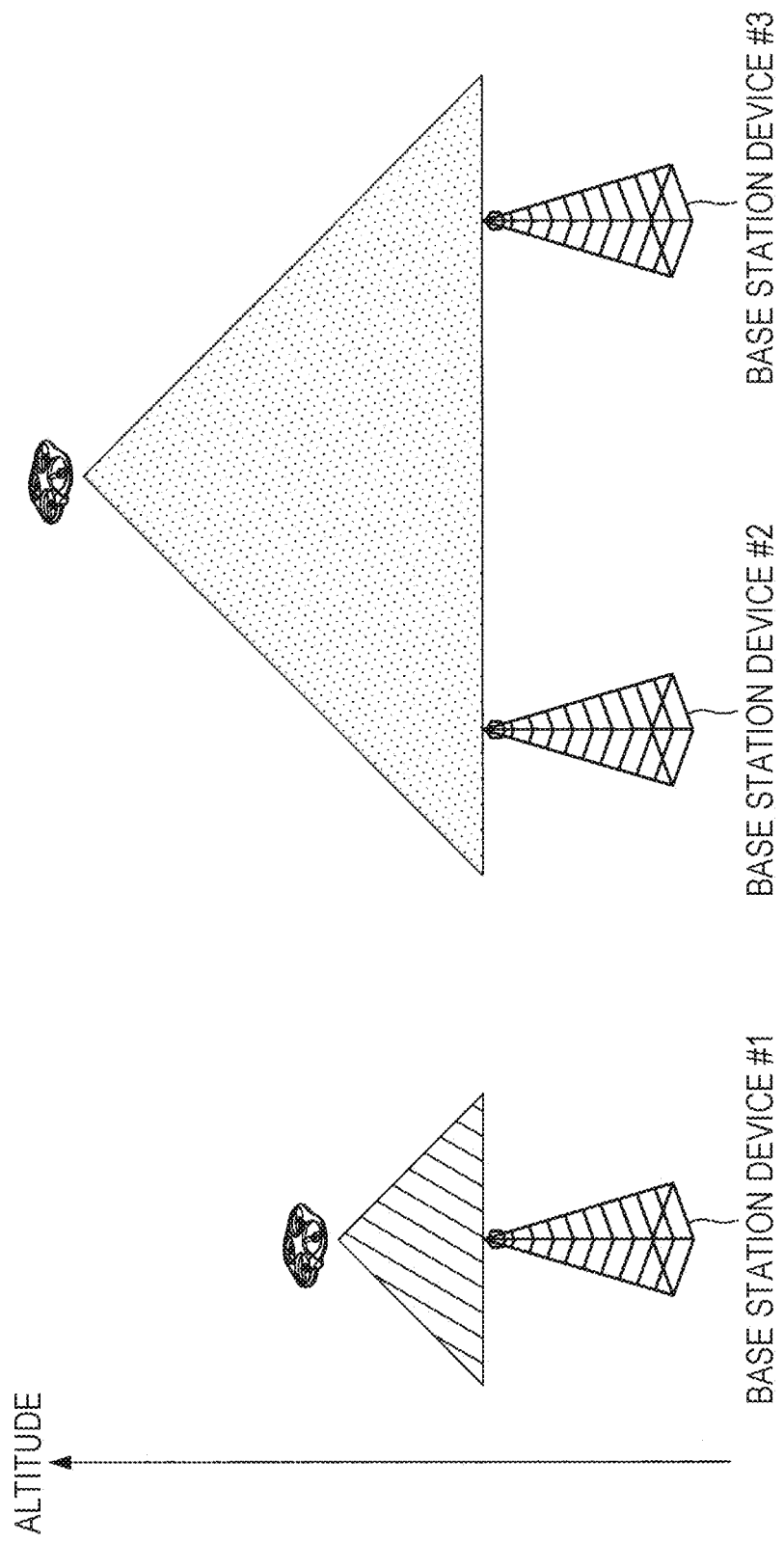
FIG. 3 is a diagram illustrating an example of a cellular network supporting aerial vehicles according to the present embodiment.

A specific example will now be described with reference to FIG. 3. An uplink signal transmitted by the aerial user equipment #1 floating at a lower altitude near the base station device has a smaller spread of propagation and less affected by inter-cell interference. On the other hand, an uplink signal transmitted by the aerial user equipment #2 floating at a higher altitude far from the base station device has a larger spread of propagation, and thus the base station device #2 and the base station device #3 receive the uplink signal to a significant extent. Therefore, the uplink signal transmitted by the aerial user equipment #2 is more affected by inter-cell interference.

1.3. Overview of Proposed Technique

Accordingly, in view of the above-described technical problem, the present disclosure proposes a mechanism capable of reducing uplink inter-cell interference with surrounding cells.

1.4. Related Technology

The following describes a technology related to the proposed technique.
<1.4.1. Frame Configuration>
In each of LTE cells, a single predetermined parameter is used for a predetermined time length (a subframe, for example). That is, in an LTE cell, a downlink signal and an uplink signal are each generated by using a single predetermined parameter for a predetermined time length. In other words, the terminal device 200 assumes that a downlink signal to be transmitted from the base station device 100 and an uplink signal to be transmitted to the base station device 100 are each generated with a single predetermined parameter for a predetermined time length. Furthermore, the base station device 100 can be configured such that a downlink signal to be transmitted to the terminal device 200 and an uplink signal to be transmitted from the terminal device 200 are each generated with a single predetermined parameter for a predetermined time length. The single predetermined parameter has, for example, a subcarrier spacing of 15 kHz.

In each of NR cells, one or more predetermined parameters are used for a predetermined time length (a slot, for example). That is, in an NR cell, a downlink signal and an uplink signal are each generated by using one or more predetermined parameters for a predetermined time length. In other words, the terminal device 200 assumes that a downlink signal to be transmitted from the base station device 100 and an uplink signal to be transmitted to the base station device 100 are each generated with one or more predetermined parameters for a predetermined time length. Furthermore, the base station device 100 can be configured such that a downlink signal to be transmitted to the terminal device 200 and an uplink signal to be transmitted from the terminal device 200 are each generated with one or more predetermined parameters for a predetermined time length. In a case where a plurality of predetermined parameters is used, a signal generated by using these predetermined parameters is multiplexed by a predetermined method. For example, the predetermined method includes frequency division multiplexing (FDM), time division multiplexing (TDM), code division multiplexing (CDM), spatial division multiplexing (SDM), and/or the like.

Figure 4:
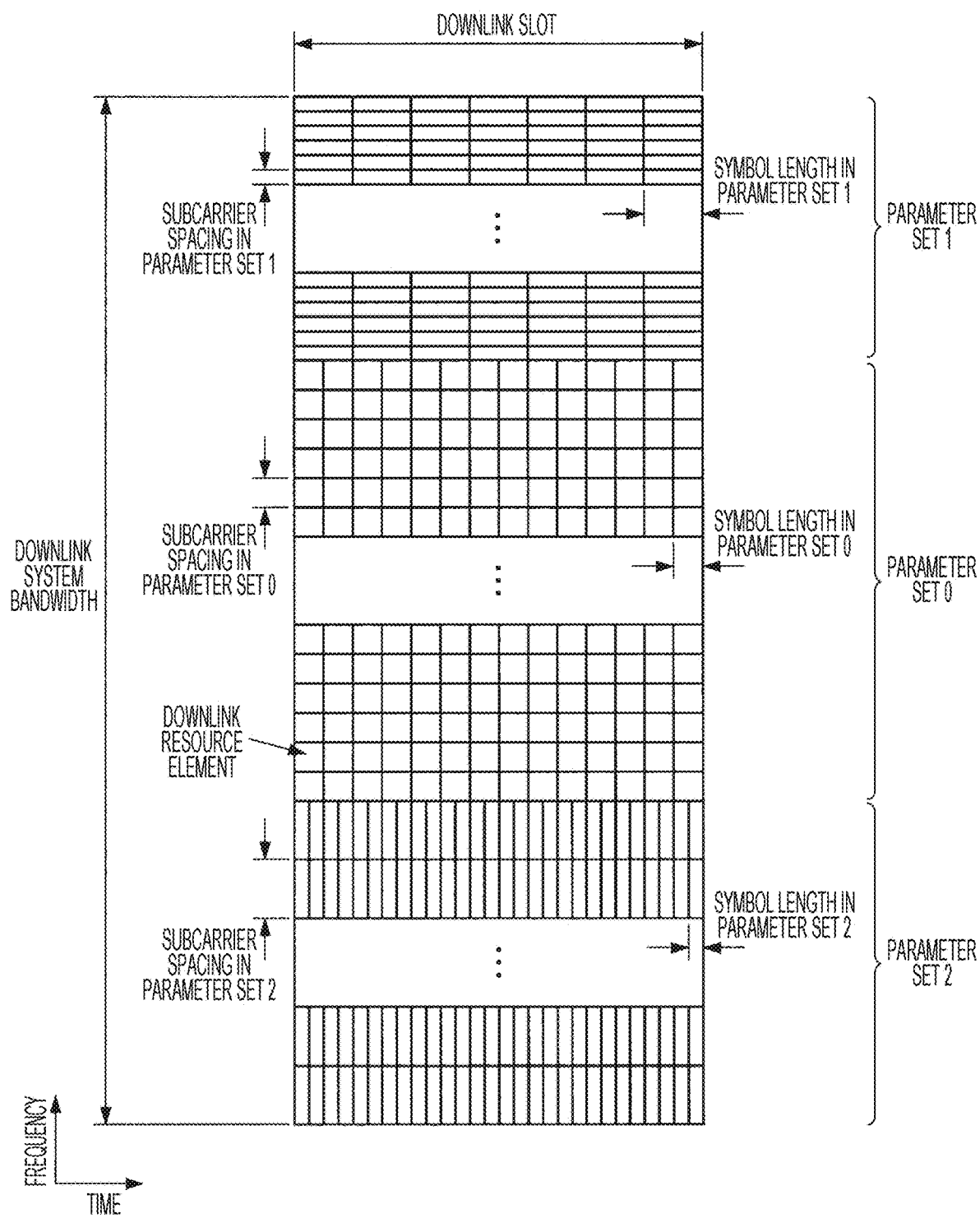
FIG. 4 is a diagram illustrating an example of a downlink slot according to the present embodiment.

FIG. 4 is a diagram illustrating an example of a downlink slot according to the present embodiment. With reference to the example in FIG. 4, in NR, signals generated by using the parameter set 1, the parameter set 0, and the parameter set 2 are subjected to FDM and transmitted and received in a cell (system bandwidth). Furthermore, with reference to the example in FIG. 4, in LTE, signals generated by using any one of the parameter set 1, the parameter set 0, or the parameter set 2 are transmitted and received in a cell (system bandwidth). The diagram shown in FIG. 4 is also referred to as a downlink resource grid. The base station device 100 can transmit a downlink physical channel and/or a downlink physical signal in a downlink slot to the terminal device 200. The terminal device 200 can receive a downlink physical channel and/or a downlink physical signal in a downlink slot from the base station device 100.

Figure 5:
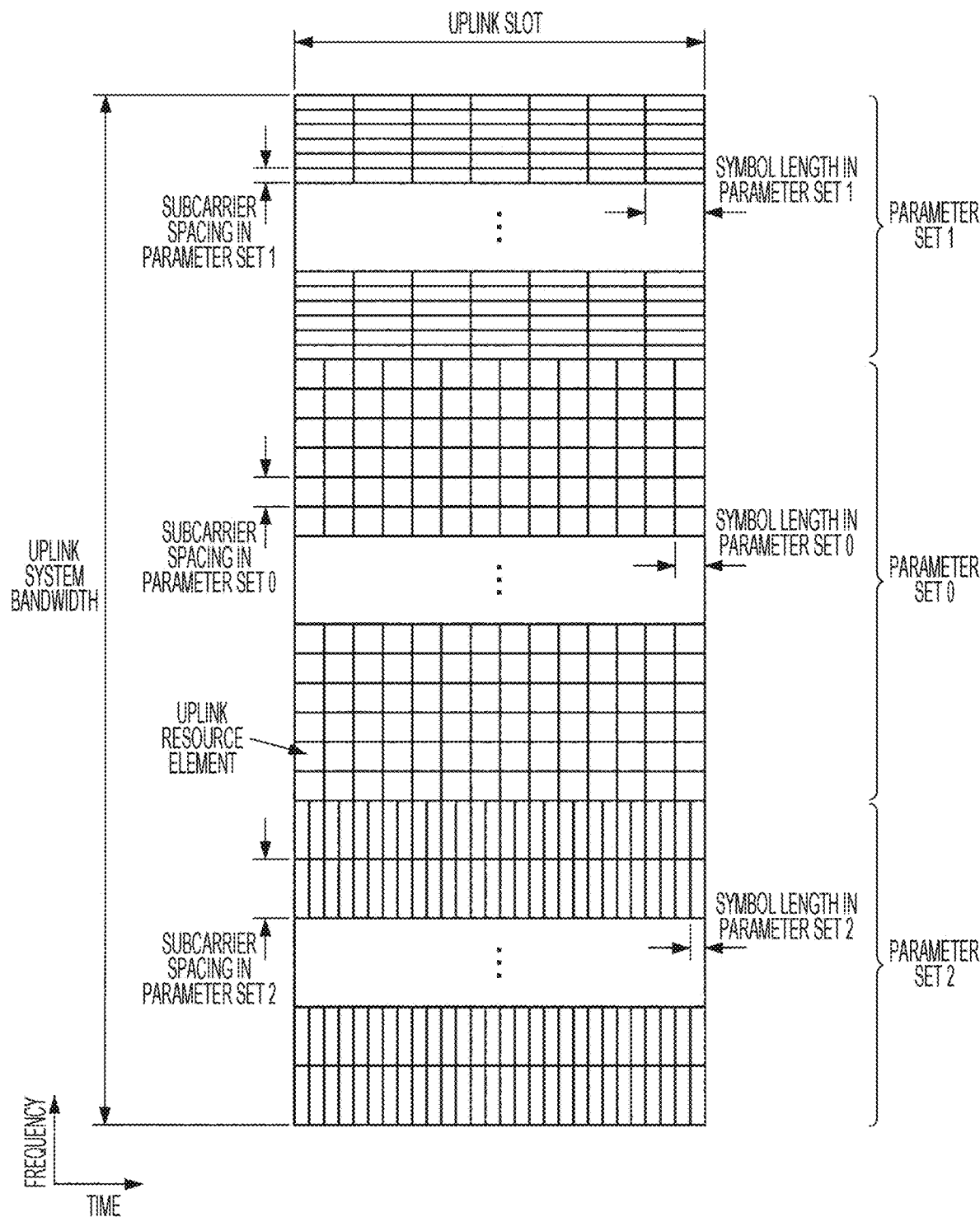
FIG. 5 is a diagram illustrating an example of an uplink slot according to the present embodiment.

FIG. 5 is a diagram illustrating an example of an uplink slot according to the present embodiment. With reference to the example in FIG. 5, in NR, signals generated by using the parameter set 1, the parameter set 0, and the parameter set 2 are subjected to FDM and transmitted and received in a cell (system bandwidth). Furthermore, with reference to the example in FIG. 5, in LTE, signals generated by using any one of the parameter set 1, the parameter set 0, or the parameter set 2 are transmitted and received in a cell (system bandwidth). The diagram shown in FIG. 5 is also referred to as an uplink resource grid. The base station device 100 can transmit an uplink physical channel and/or an uplink physical signal in an uplink slot to the terminal device 200. The terminal device 200 can receive an uplink physical channel and/or an uplink physical signal in an uplink slot from the base station device 100.

In the present embodiment, a physical resource may be defined as follows. A single slot is defined by a plurality of symbols. A physical signal or a physical channel transmitted in each of the slots is expressed by a resource grid. The resource grid is defined by a plurality of subcarriers along the frequency direction and a plurality of symbols (OFDM symbols or SC-FDMA symbols) along the time direction. The number of subcarriers or resource blocks may be determined depending on the bandwidth of a cell. The number of symbols in a single slot is determined by the type of cyclic prefix (CP). The type of CP is normal CP or extended CP. In the case of normal CP, the number of OFDM symbols or SC-FDMA symbols constituting a single slot is seven. In the case of extended CP, the number of OFDM symbols or SC-FDMA symbols constituting a single slot is six. Each of the elements in a resource grid is called a resource element. A resource element is identified by using an index (number) of a subcarrier and an index (number) of a symbol. Note that, in the description of the present embodiment, an OFDM symbol or an SC-FDMA symbol is also simply called a symbol.

A resource block is used for mapping a certain physical channel (such as PDSCH or PUSCH) to resource elements. Resource blocks include virtual resource blocks and physical resource blocks. A certain physical channel is mapped to a virtual resource block. Virtual resource blocks are mapped to physical resource blocks. A single physical resource block is defined by a predetermined number of consecutive symbols in the time domain. A single physical resource block is defined by a predetermined number of consecutive subcarriers in the frequency domain. The number of symbols and the number of subcarriers in a single physical resource block are determined on the basis of the type of CP in the cell, the subcarrier spacing and/or parameters set by a higher layer, and the like. For example, in a case where the type of CP is normal CP and the subcarrier spacing is 15 kHz, the number of symbols and the number of subcarriers in a single physical resource block are 7 and 12, respectively. In this case, a single physical resource block includes (7×12) resource elements. Physical resource blocks are numbered from 0 in the frequency domain. Furthermore, two resource blocks corresponding to the same physical resource block number in a single subframe are defined as a pair of physical resource blocks (a PRB pair or a RB pair).

<1.4.2. Physical Signal and Physical Channel>

A synchronization signal (SS) is used in order that the terminal device 200 is synchronized in the frequency domain and/or the time domain for at least downlink. Synchronization signals include a primary synchronization signal (PSS) and a secondary synchronization signal (SSS). In LTE, a synchronization signal is placed in a predetermined subframe in a radio frame. For example, in the TDD scheme, a synchronization signal is placed in subframes 0, 1, 5, and 6 in a radio frame. In the FDD scheme, a synchronization signal is placed in subframes 0 and 5 in a radio frame. In NR, a synchronization signal is included in a synchronization signal block (SS block).

PSS may be used for rough frame/symbol timing synchronization (synchronization in the time domain) or for identifying a cell identification group. SSS may be used for more accurate frame timing synchronization, cell identification, or CP length detection. In other words, frame timing synchronization and cell identification can be performed by using PSS and SSS.

A physical broadcast channel (PBCH) is used to broadcast a master information block (MIB), which is broadcast information specific to the serving cell of the base station device 100. MIB is system information. For example, MIB includes information necessary for receiving PDCCH and information indicating a radio frame number (a system frame number (SFN)). In LTE, PBCH is placed in subframe 0. In NR, PBCH is included in a synchronization signal block.

In NR, a synchronization signal block includes PSS, SSS, PBCH, and DMRS for PBCH. PSS, SSS, PBCH, and DMRS for PBCH included in a synchronization signal block are placed in a resource of 288 subcarriers by 4 symbols. The synchronization signal block is placed in predetermined four symbols in a radio frame.

The cell-specific reference signal (CRS) is used for, at the terminal device 200, FFT window timing synchronization (fine synchronization), frequency and time tracking, calculation of downlink channel state information, downlink RRM measurement, and demodulation of PDCCH/PDSCH. In LTE, CRS is transmitted in every subframe. CRS is transmitted through antenna ports 0 to 3. CRS is transmitted by using the 1st, 4th, 7th, and 10th symbols in a subframe. The CRS transmitted through a predetermined antenna port is placed at six-subcarrier intervals, and is further cyclic shifted on the basis of a physical cell identifier. In other words, CRS is cyclically transmitted for six cells on the frequency axis. Note that CRS is not transmitted in an NR cell.

The channel state information reference signal (CSI-RS) is used for, at the terminal device 200, calculation of downlink channel state information and downlink RRM measurement. Note that CSI-RS may be used for frequency and time tracking. CSI-RS is transmitted in a configured subframe. The resource for transmitting CSI-RS is configured by the base station device 100. The terminal device 200 uses the CSI-RS to perform signal measurement (channel measurement). CSI-RS supports stetting some or all of the antenna ports 1, 2, 4, 8, 12, 16, 24, and 32. Note that the supported antenna port may be determined on the basis of the terminal device 200 capability, RRC parameter settings, and/or the transmission mode to be set for the terminal device 200.

The resource for a zero power CSI-RS (ZP CSI-RS) is set by a higher layer. The resource for ZP CSI-RS may be transmitted with zero output power. That is, nothing may be transmitted as the resource for ZP CSI-RS. In the resource in which ZP CSI-RS is set, neither PDSCH nor PDCCH is transmitted. For example, the resource for ZP CSI-RS is used for a neighbor cell to transmit NZP CSI-RS. Furthermore, the resource for ZP CSI-RS is used for, for example, measuring CSI-IM. Furthermore, for example, the resource for ZP CSI-RS is a resource with which a predetermined channel such as PDSCH is not transmitted. In other words, the predetermined channel is mapped (rate-matched or punctured) except the resource for ZP CSI-RS.

The physical downlink control channel (PDCCH) is used for transmitting downlink control Information (DCI). Mapping of an information bit of the downlink control information is defined as a DCI format. The downlink control information includes a downlink grant and an uplink grant. The downlink grant is also referred to as a downlink assignment or a downlink allocation. PDCCH is transmitted by a set of one or more consecutive control channel elements (CCEs). In LTE, a CCE includes nine resource element groups (REGs). In NR, a CCE includes six REGs. In LTE, an REG includes four resource elements. In NR, an REG includes one resource block and one OFDM symbol. In a case where a PDCCH includes n consecutive CCEs, the PDCCH starts from the CCE that satisfies the condition that the remainder obtained by dividing i by n is 0, where i is the index (number) of the CCE.

The PDCCH region is a resource where a PDCCH can be placed. In an LTE cell, the PDCCH region is set across the full system bandwidth. In an NR cell, the PDCCH region is set in a predetermined number of symbols and a predetermined number of resource blocks. In an NR cell, the PDCCH region is also referred to as a control resource set (CORESET).

In an LTE cell, an enhanced physical downlink control channel (EPDCCH) can be used for transmitting downlink control information (DCI). EPDCCH is transmitted by a set of one or more consecutive enhanced control channel elements (ECCEs). ECCE includes a plurality of enhanced resource element groups (EREGs).

The EPDCCH region is a resource where an EPDCCH can be placed. In an LTE cell, the EPDCCH region is set in a predetermined number of resource blocks. The EPDCCH region is also referred to as an EPDCCH set.

The physical downlink shared channel (PDSCH) is used for transmitting downlink data (downlink shared channel (DL-SCH)). Furthermore, PDSCH is also used for transmitting control information regarding a higher layer.

The demodulation reference signal (DMRS) associated with PDSCH is transmitted through a subframe and a band used for transmitting the PDSCH with which the DMRS is associated. DMRS is used for demodulation of the PDSCH with which the DMRS is associated.

In an LTE cell, the DMRS associated with EPDCCH is transmitted through a slot and a resource block used for transmitting the EPDCCH with which the DMRS is associated. DMRS is used for demodulation of the EPDCCH with which the DMRS is associated.

In an NR cell, the DMRS associated with PDCCH is transmitted through a slot and a resource block used for transmitting the PDCCH with which the DMRS is associated. DMRS is used for demodulation of the PDCCH with which the DMRS is associated.

The discovery reference signal (DRS) or discovery signal is used for detection of a cell and downlink RRM measurement at the terminal device 200. Note that DRS may be used for calculation of downlink channel state information and downlink tracking. DRS includes one PSS, one SSS, and a CRS. DRS may further include a CSI-RS. In NR, DRS may include DMRS for PBCH.

The physical uplink control channel (PUCCH) is a physical channel used for transmitting uplink control Information (UCI). The uplink control information includes downlink channel state information (CSI), a scheduling request (SR) indicating a request for a PUSCH resource, and HARQ-ACK to downlink data (a transport block (TB) or a downlink-shared channel (DL-SCH)). HARQ-ACK may also be called ACK/NACK, HARQ feedback, or response information. Furthermore, the HARQ-ACK to downlink data indicates ACK, NACK, or DTX.

The physical uplink shared channel (PUSCH) is a physical channel used for transmitting uplink data (uplink-shared channel (UL-SCH)). Furthermore, PUSCH may be used for transmitting HARQ-ACK and/or channel state information along with uplink data. Furthermore, PUSCH may be used for transmitting either channel state information only or HARQ-ACK and channel state information only.

The physical random access channel (PRACH) is a physical channel used for transmitting a random access preamble. The random access preamble is also referred to as a PRACH preamble. PRACH can be used for the terminal device 200 to synchronize with the base station device 100 in the time domain. Furthermore, PRACH is also used for indicating an initial connection establishment procedure (process), a handover procedure, a connection re-establishment procedure, synchronization (timing adjustment) for uplink transmission, and/or a request for a PUSCH resource.

An uplink demodulation reference signal (UL-DMRS) is related to transmission of PUSCH or PUCCH. UL-DMRS is time-multiplexed with PUSCH or PUCCH. The base station device 100 may use UL-DMRS to correct the propagation path for PUSCH or PUCCH. In the description of the present embodiment, transmission of PUSCH also includes multiplexing and transmitting the PUSCH and UL-DMRS. In the description of the present embodiment, transmission of PUCCH also includes multiplexing and transmitting the PUCCH and UL-DMRS.

The base station device 100 may use a sounding reference signal (SRS) to measure the uplink channel state. In LTE, SRS is transmitted by using the last symbol or the second symbol from the last one in an uplink subframe or in a special subframe. In NR, SRS is transmitted by using four symbols in the rear of a slot.

<1.4.3. Initial Access>

Initial connection (initial access) is a process of transitioning from a state in which the terminal device 200 is not connected to any cell (idle state) to a state in which the terminal device 200 has established connection with a cell (connection state).

Figure 6:
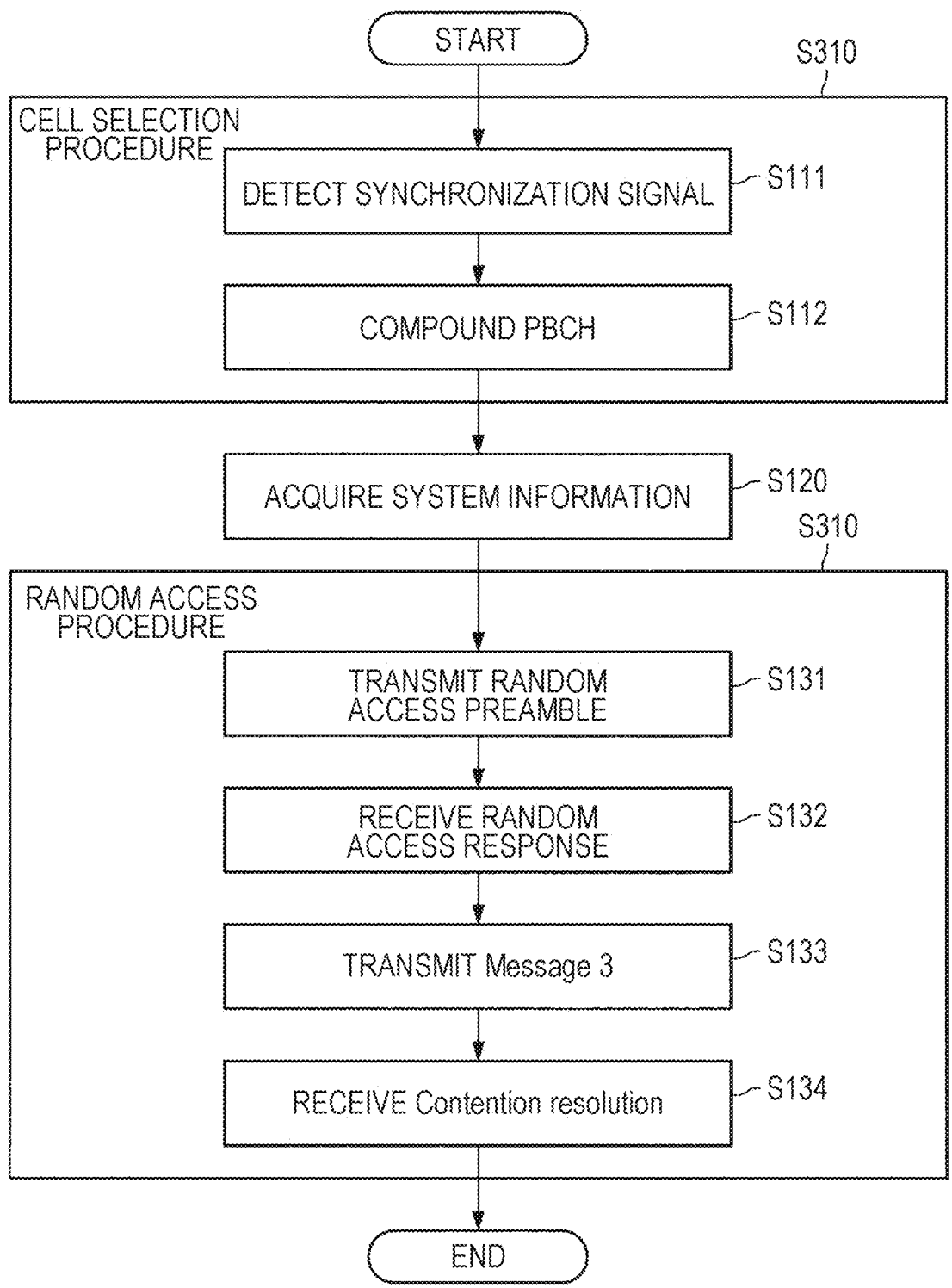
FIG. 6 is a flowchart showing an example of an initial connection procedure for a terminal device 200 according to the present embodiment.

FIG. 6 is a flowchart showing an example of an initial connection procedure for the terminal device 200 according to the present embodiment. As shown in FIG. 6, the terminal device 200 in the idle state executes a cell selection procedure (step S110). The cell selection procedure includes the steps of detecting a synchronization signal (step S111) and decoding the PBCH (step S112). On the basis of detection of a synchronization signal, the terminal device 200 synchronizes with a cell in downlink. Then, after downlink synchronization is established, the terminal device 200 attempts to decode the PBCH to acquire first system information.

Next, on the basis of the first system information included in the PBCH, the terminal device 200 acquires second system information (step S120).

Next, on the basis of the first system information and/or the second system information, the terminal device 200 executes a random access procedure (RACH procedure) (step S130). The random access procedure includes the steps of transmitting a random access preamble (step S131), receiving a random access response (step S132), transmitting Message 3 (step S133), and receiving a contention resolution (step S134). First, the terminal device 200 selects a predetermined PRACH preamble and transmits the selected PRACH preamble. Then, the terminal device 200 receives a PDSCH that includes a random access response corresponding to the transmitted PRACH preamble. Next, the terminal device 200 transmits the PUSCH that includes Message 3, using the resource scheduled by the random access response grant included in the received random access response. Finally, the terminal device 200 receives a PDSCH that includes the contention resolution corresponding to the PUSCH.

Message 3 includes an RRC message of RRC connection request. The contention resolution includes an RRC message of RRC connection setup. Upon receipt of the RRC message of RRC connection setup, the terminal device 200 performs an RRC connection action to transition from the RRC idle state to the RRC connection state. After transiting to the RRC connection state, the terminal device 200 transmits an RRC message of RRC connection setup complete to the base station device 100. Through the series of actions, the terminal device 200 can be connected to the base station device 100.

Note that the random access preamble may be called Message 1, the random access response may be called Message 2, the contention resolution may be called Message 4, and the message of RRC connection setup complete may be called Message 5.

After all the steps of the random access procedure are completed, the terminal device 200 is allowed to transition to the state in which the terminal device 200 is connected to the cell (connection state).

Note that the random access procedure shown in FIG. 6 is also referred to as a four-step RACH procedure. On the other hand, the random access procedure in which the terminal device 200 transmits Message 3 while transmitting a random access preamble and the base station device 100 transmits a random access response as a response thereto while transmitting a contention resolution is referred to as a two-step RACH procedure.

A random access preamble is transmitted in association with the PRACH. A random access response is carried by PDSCH. The PDSCH including a random access response is scheduled by PDCCH. Message 3 is carried by PUSCH. The PUSCH including Message 3 is scheduled by the uplink grant included in the random access response.

<1.4.4. RRM Measurement and Reporting>

Radio resource management (RRM) measurement is performed at the base station device 100 and at the terminal device 200. Information regarding the RRM measurement is used when determinations about cell selection, cell reselection, handover, radio resource control, and the like are made.

The RRM measurement measures the signal power strength and communication quality between the base station device 100 and the terminal device 200. Specifically, reference signal received power (RSRP), reference signal received quality (RSRQ), received signal strength indicator (RSSI), signal to interference plus noise ratio (SINR), and the like are measured. RSRP is mainly used for determining the quality of communication from the base station device 100, measuring the path loss, and the like. RSRQ and SINR are mainly used for, for example, determining the quality of communication with the base station device 100. RSSI is mainly used for, for example, measuring interference in the radio resource.

RSRP is the received power of a predetermined reference signal. The predetermined reference signal is, for example, CRS, SSS, DMRS related to PBCH, CSI-RS transmitted through a predetermined antenna port, and the like. RSRP is defined as, for example, the received power of a single resource element.

RSSI is the average power of the total received power measured in a predetermined time period. RSSI includes all the received power from, for example, serving cells, non-serving cells, neighbor channel interference, and thermal noise. RSSI is defined as the received power of a single OFDM symbol.

RSRQ is defined as the ratio of RSRP to RSSI. Specifically, RSRQ is a value obtained by dividing RSRP by RSSI. Note that RSRQ may be defined as a value obtained by multiplying the above-described value by the number of resource blocks or the number of resource elements for which RSSI has been measured.

SINR is defined as the ratio of the received power from a predetermined base station device 100 to the received power from somewhere other than the predetermined base station device 100. The SINR measured by using a resource for a predetermined synchronization signal is called SS-SINR. The SINR measured by using a resource for a predetermined reference signal is called RS-SINR.

The result of the RRM measurement performed at the terminal device 200 may be reported to the base station device 100. The result of the RRM measurement may be reported in a case where the result satisfies a predetermined condition. Examples of the predetermined condition include: that the measurement result is above or below a threshold specified from a higher layer; that the measurement result is below a threshold specified from a higher layer; that the result of measurement on the target cell (for example, a serving cell) is above or below the result of measurement on another cell (for example, a neighbor cell); and that a predetermined time has passed since the previous report.

<1.4.5. Uplink Power Control>

In the present embodiment, the transmission power of an uplink channel and an uplink signal is controlled in according with the information to be transmitted, the resource block to be used, the transmission environment, the instruction from the base station, and so on.

The following is an example of an equation for PUSCH transmission power control in the present embodiment:

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$ [Math. 1]

In the above mathematical equation, $P_{CMAX,c}(i)$ is the maximum transmission power in the i-th subframe for the cell c. In addition, $P_{PUSCH,c}(i)$ is the transmission power value of PUSCH in the i-th subframe. $M_{PUSCH,c}(i)$ is the number of physical resource blocks for PUSCH transmission allocated to the i-th subframe. $P_{O\_PUSCH,c}(j)$ is a predetermined transmission power serving as basis for PUSCH. $\alpha_c(j)$ is a coefficient to be multiplied by path loss. $PL_c$ is the path loss calculated from a downlink signal. $\Delta_{TF,c}(i)$ is an offset value dependent on the modulation scheme or the like. $f_c(i)$ is the cumulative value of TPC command related to PUSCH as indicated by the base station.

The following is an example of an equation for PUCCH transmission power control in the present embodiment:

$$P_{PUCCH}(i) = \min \begin{cases} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{cases}$$ [Math. 2]

In the above mathematical equation, $P_{CMAX,c}(i)$ is the maximum transmission power in the i-th subframe for the cell c. In addition, $P_{PUCCH,c}(i)$ is the transmission power value of PUCCH in the i-th subframe. $P_{O\_PUCCH}$ is a predetermined transmission power serving as basis for PUCCH. $PL_c$ is the path loss calculated from a downlink signal. $h(n_{CQI}, N_{HARQ}, n_{SR})$ is a value that is set in accordance with the number of information bits of the uplink control information. $n_{CQI}$ is the number of CQI information bits, $n_{HARQ}$ is the number of HARQ-ACK information bits, and $n_{SR}$ is the number of SR information bits. $\Delta_{F\_PUCCH}(F)$ is an offset value given by RRC signaling. $\Delta_{TxD}(F')$ is an offset value to be used for transmission through two or more antenna ports. $g(i)$ is the cumulative value of TPC command related to PUCCH as indicated by the base station.

The following is an example of an equation for SRS transmission power control in the present embodiment:

$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\}$ [Math. 3]

In the above mathematical equation, $P_{CMAX,c}(i)$ is the maximum transmission power in the i-th subframe for the cell c. In addition, $P_{SRS,c}(i)$ is the transmission power value of SRS in the i-th subframe. $P_{SRS\_OFFSET,c}(M)$ is an offset value corresponding to the SRS transmission type set by RRC signaling. $M_{SRS,c}$ is the number of SRS transmission resource blocks for the cell c. $P_{O\_PUSCH,c}(j)$ is a predetermined transmission power serving as basis for PUSCH. $\alpha_c(j)$ is a coefficient to be multiplied by path loss. $PL_c$ is the path loss calculated from a downlink signal. $f_c(i)$ is the cumulative value of TPC command related to PUSCH as indicated by the base station.

According to the above mathematical equations, the transmission power of PUSCH, PUCCH, and SRS is calculated on the basis of the path loss calculated from a downlink signal. Furthermore, for PUSCH and SRS, the transmission power is controlled by the alpha coefficient ($\alpha_c(j)$). Therefore, the base station device is able to control the uplink transmission power of the terminal device located at a cell edge, and to control the reception SINR and the interference between neighbor cells.

$P_O$ is a transmission power control parameter that is set on the basis of a higher layer (RRC signaling). $P_O$ includes $P_{O\_PUSCH,c}(j)$ and $P_{O\_PUCCH}$. With this $P_O$, the base station device can quasi-statically indicate the transmission power of the terminal device.

<1.4.6. Uplink Inter-Cell Interference Control>

In the present embodiment, the high interference indicator (HII) and/or the overload indicator (CI) is used as a method for controlling a resource against uplink inter-cell interference.

HII is an indicator used by the predetermined base station device 100 to notify, via the X2 interface, the neighbor cell (neighbor base station) that the uplink transmission from the terminal device 200 connected to the predetermined base station device 100 may cause strong interference with the neighbor cell. HII indicates high interference or low interference for each resource block in bitmap.

OI is an indicator used by a neighbor cell (neighbor base station) adjacent to the predetermined base station device 100 to notify, via the X2 interface, the base station device 100 that the neighbor cell (neighbor base station) is suffering from interference caused by the uplink transmission from a terminal device connected to the predetermined base station device 100. CI indicates high interference, medium interference, or low interference for each resource block in bitmap.

In the uplink inter-cell interference control, the base station device performs scheduling of uplink transmission on the basis of the HII and/or CI information. For example, the base station device refrains from allocating uplink transmission to the resource block identified as high interference by HII or CI. As a result, resource blocks differing among cells can be used to reduce uplink inter-cell interference.

Figure 7:
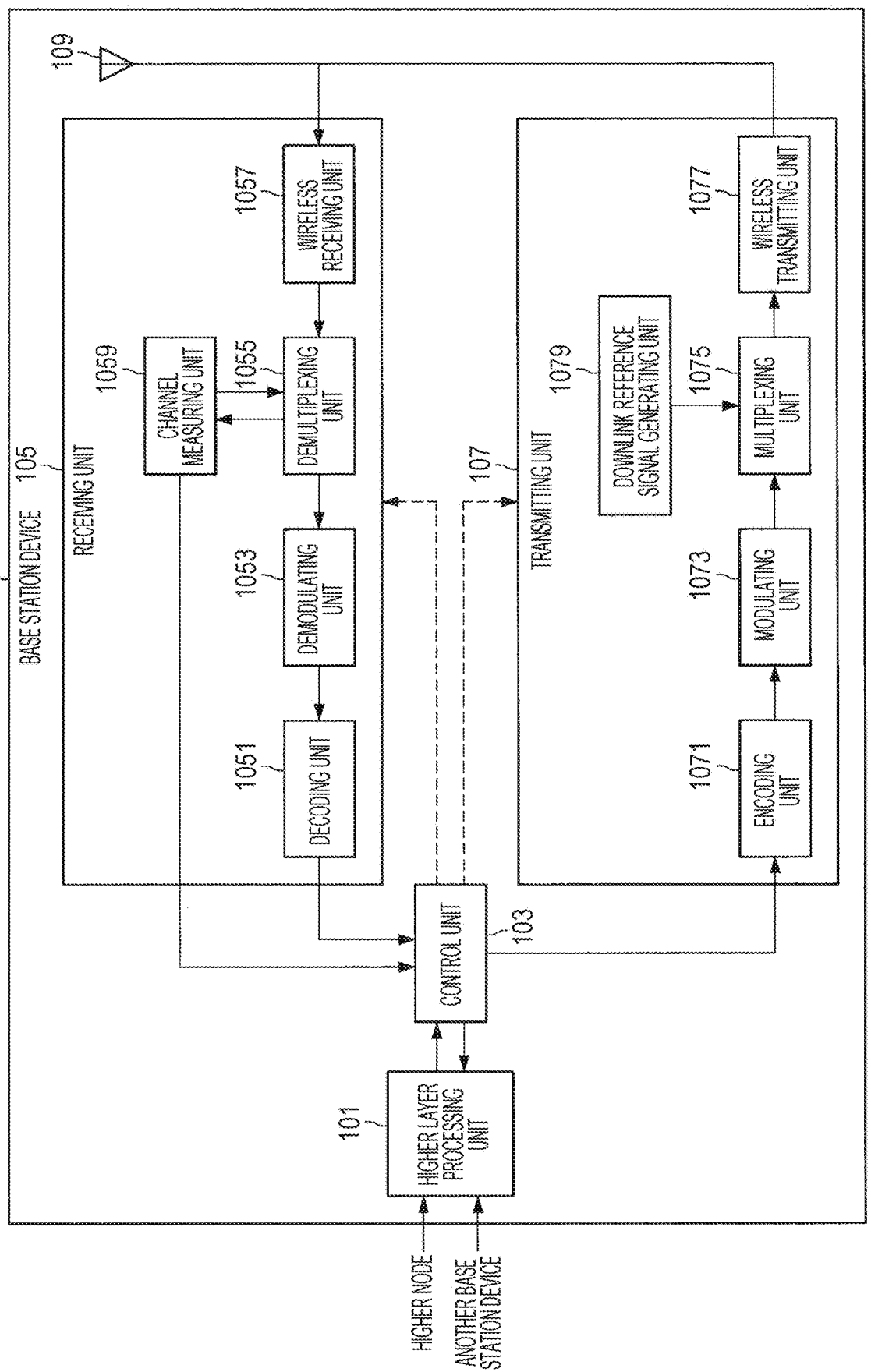
FIG. 7 is a schematic block diagram illustrating a configuration of a base station device 100 according to the present embodiment.

2. CONFIGURATION EXAMPLE 2.1. Configuration Example of Base Station Device 100 According to Present Embodiment FIG. 7 is a schematic block diagram illustrating a configuration of the base station device 100 according to the present embodiment. As shown in the figure, the base station device 100 includes a higher layer processing unit 101, a control unit 103, a receiving unit 105, a transmitting unit 107, and a transceiver antenna 109. Furthermore, the receiving unit 105 includes a decoding unit 1051, a demodulating unit 1053, a demultiplexing unit 1055, a wireless receiving unit 1057, and a channel measuring unit 1059. Furthermore, the transmitting unit 107 includes an encoding unit 1071, a modulating unit 1073, a multiplexing unit 1075, a wireless transmitting unit 1077, and a downlink reference signal generating unit 1079.

As described above, the base station device 100 is capable of supporting one or more RATs. Some or all of the units included in the base station device 100 illustrated in FIG. 7 may be individually configured in accordance with the RAT. For example, the receiving unit 105 and the transmitting unit 107 are individually configured in LTE and NR. Furthermore, in an NR cell, some or all of the units included in the base station device 100 illustrated in FIG. 7 may be individually configured in accordance with the parameter set related to a transmission signal. For example, in a certain NR cell, the wireless receiving unit 1057 and the wireless transmitting unit 1077 may be individually configured in accordance with the parameter set related to a transmission signal.

The higher layer processing unit 101 performs processing on a medium access control (MAC) layer, a packet data convergence protocol (PDCP) layer, a radio link control (RLC) layer, and a radio resource control (RRC) layer. Furthermore, the higher layer processing unit 101 generates control information for controlling the receiving unit 105 and the transmitting unit 107 and outputs the generated control information to the control unit 103.

On the basis of the control information from the higher layer processing unit 101, the control unit 103 controls the receiving unit 105 and the transmitting unit 107. The control unit 103 generates control information for the higher layer processing unit 101 and outputs the generated control information to the higher layer processing unit 101. The control unit 103 receives a decoded signal from the decoding unit 1051 and a channel estimation result from the channel measuring unit 1059. The control unit 103 outputs a signal to be encoded to the encoding unit 1071. Furthermore, the control unit 103 is used for controlling the base station device 100 in whole or in part.

The higher layer processing unit 101 performs processing and management related to RAT control, radio resource control, subframe settings, scheduling control, and/or CSI report control. The processing and management in the higher layer processing unit 101 are performed either for each terminal device 200 or in common with the terminal devices 200 connected to the base station device 100. The processing and management in the higher layer processing unit 101 may be performed only by the higher layer processing unit 101 or may be acquired from a higher node or another base station device 100. Furthermore, the processing and management in the higher layer processing unit 101 may be performed individually in accordance with the RAT. For example, the higher layer processing unit 101 performs the processing and management separately between LTE and NR.

The RAT control in the higher layer processing unit 101 provides management related to the RAT. For example, the RAT control provides management related to LTE and/or management related to NR. The management related to NR includes setting and processing of a parameter set related to transmission signals in an NR cell.

In the radio resource control in the higher layer processing unit 101, downlink data (transport blocks), system information, RRC messages (RRC parameters), and/or MAC control elements (CEs) are generated and/or managed.

In the subframe settings in the higher layer processing unit 101, subframe settings, subframe pattern settings, uplink-downlink settings, uplink reference UL-DL settings, and/or downlink reference UL-DL settings are managed. Note that the subframe setting in the higher layer processing unit 101 is also referred to as base station subframe setting. Furthermore, the subframe settings in the higher layer processing unit 101 can be determined on the basis of the uplink traffic volume and the downlink traffic volume. Furthermore, the subframe settings in the higher layer processing unit 101 can be determined on the basis of the scheduling result of the scheduling control in the higher layer processing unit 101.

In the scheduling control in the higher layer processing unit 101, the frequency and the subframe to which a physical channel is allocated, the coding rate, modulation scheme, and transmission power of the physical channel, and the like are determined on the basis of the received channel state information, the estimated value of a propagation path and the channel quality as input from the channel measuring unit 1059, and the like. For example, on the basis of the scheduling result of the scheduling control in the higher layer processing unit 101, the control unit 103 generates control information (DCI format).

In the CSI report control in the higher layer processing unit 101, CSI reporting on the terminal device 200 is controlled. For example, settings regarding the CSI reference resource to be estimated for calculating the CSI in the terminal device 200 are controlled.

Under control of the control unit 103, the receiving unit 105 receives a signal transmitted from the terminal device 200 via the transceiver antenna 109, further performs reception processing on the signal such as demultiplexing, demodulation, and decoding, and outputs the information that has undergone the reception processing to the control unit 103. Note that the receiving unit 105 performs the reception processing on the basis of predetermined settings or settings provided as notification by the base station device 100 to the terminal device 200.

The wireless receiving unit 1057 performs, on an uplink signal received via the transceiver antenna 109, conversion into an intermediate frequency (down-conversion), removal of an unnecessary frequency component, control of the amplification level to keep the signal at an appropriate level, quadrature demodulation based on an in-phase component and a quadrature component of the received signal, conversion from an analog signal into a digital signal, removal of guard interval (GI), and/or extraction of a signal in the frequency domain through a fast Fourier transform (FFT).

The demultiplexing unit 1055 separates an uplink channel such as PUCCH or PUSCH and/or an uplink reference signal from the signal input from the wireless receiving unit 1057. The demultiplexing unit 1055 outputs the uplink reference signal to the channel measuring unit 1059. The demultiplexing unit 1055 compensates for the propagation path for the uplink channel on the basis of the estimated value of the propagation path as input from the channel measuring unit 1059.

The demodulating unit 1053 demodulates the received signal for the uplink channel modulation symbol by using a modulation scheme such as binary phase shift keying (BPSK), quadrature phase shift keying (QPSK), 16 quadrature amplitude modulation (16QAM), 64QAM, or 256QAM. The demodulating unit 1053 demultiplexes and demodulates a MIMO-multiplexed uplink channel.

The decoding unit 1051 performs decoding processing on the encoded bits of the demodulated uplink channel. The decoded uplink data and/or uplink control information is output to the control unit 103. On PUSCH, the decoding unit 1051 performs decoding processing for each transport block.

The channel measuring unit 1059 measures the estimated value of the propagation path, the channel quality, and/or the like from the uplink reference signal input from the demultiplexing unit 1055, and outputs the measurements to the demultiplexing unit 1055 and/or the control unit 103. For example, the channel measuring unit 1059 measures an estimated value of a propagation path for propagation path compensation on PUCCH or PUSCH using UL-DMRS, and measures channel quality in uplink using SRS.

Under control of the control unit 103, the transmitting unit 107 performs transmission processing, such as encoding, modulation, and multiplexing, on the downlink control information and downlink data as input from the higher layer processing unit 101. For example, the transmitting unit 107 generates and multiplexes a PHICH, a PDCCH, an EPDCCH, a PDSCH, and a downlink reference signal to generate a transmission signal. Note that the transmission processing in the transmitting unit 107 is performed on the basis of predefined settings, settings that the base station device 100 provided to the terminal device 200 as notification, or settings that are provided as notification via the PDCCH or EPDCCH transmitted through the same subframe.

The encoding unit 1071 encodes the HARQ indicator (HARQ-ACK), the downlink control information, and the downlink data input from the control unit 103 using a predetermined coding scheme such as block coding, convolutional coding, turbo coding, or the like. The modulating unit 1073 modulates the encoded bits input from the encoding unit 1071 using a predetermined modulation scheme such as BPSK, QPSK, 16QAM, 64QAM, or 256QAM. The downlink reference signal generating unit 1079 generates a downlink reference signal on the basis of a physical cell identification (PCI), an RRC parameter set in the terminal device 200, and the like. The multiplexing unit 1075 multiplexes the modulation symbol and the downlink reference signal of each channel and places the resultant in a predetermined resource element.

The wireless transmitting unit 1077 performs processing on the signal from the multiplexing unit 1075, such as conversion into a signal in the time domain through an inverse fast Fourier transform (IFFT), addition of guard interval, generation of a baseband digital signal, conversion into an analog signal, quadrature modulation, conversion from a signal having an intermediate frequency into a signal having a high frequency (up-conversion), removal of an extra frequency component, and amplification of power to generate a transmission signal. The transmission signal output from the wireless transmitting unit 1077 is transmitted through the transceiver antenna 109.

Figure 8:
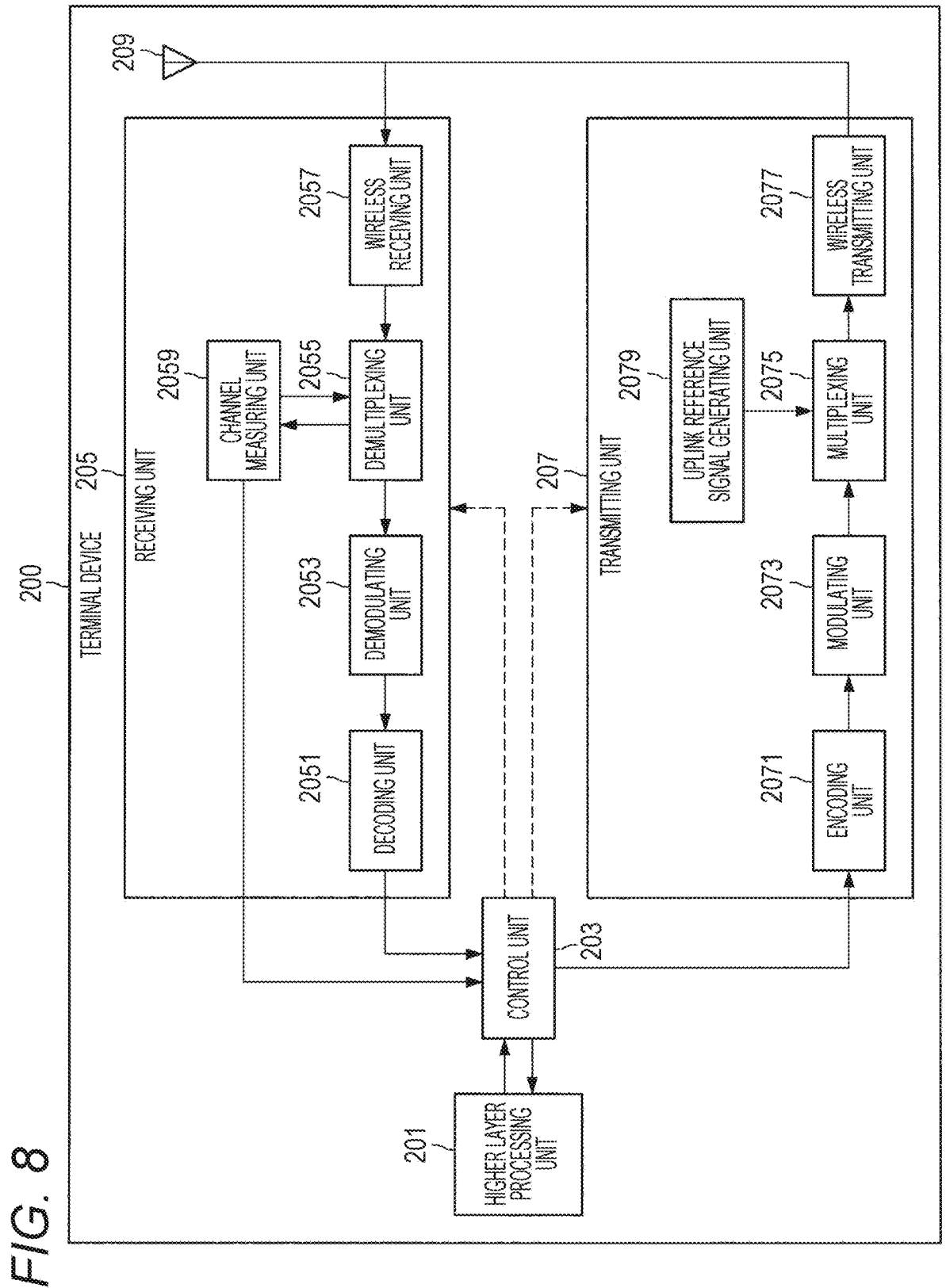
FIG. 8 is a schematic block diagram illustrating a configuration of the terminal device 200 according to the present embodiment.

2.2. Configuration Example of Terminal Device 200 According to Present Embodiment FIG. 8 is a schematic block diagram illustrating a configuration of the terminal device 200 according to the present embodiment. As shown in the figure, the terminal device 200 includes a higher layer processing unit 201, a control unit 203, a receiving unit 205, a transmitting unit 207, and a transceiver antenna 209. Furthermore, the receiving unit 205 includes a decoding unit 2051, a demodulating unit 2053, a demultiplexing unit 2055, a wireless receiving unit 2057, and a channel measuring unit 2059. Furthermore, the transmitting unit 207 includes an encoding unit 2071, a modulating unit 2073, a multiplexing unit 2075, a wireless transmitting unit 2077, and an uplink reference signal generating unit 2079.

As described above, the terminal device 200 is capable of supporting one or more RATs. Some or all of the units included in the terminal device 200 illustrated in FIG. 8 may be individually configured in accordance with the RAT. For example, the receiving unit 205 and the transmitting unit 207 are individually configured in LTE and NR. Furthermore, in an NR cell, some or all of the units included in the terminal device 200 illustrated in FIG. 8 may be individually configured in accordance with the parameter set related to a transmission signal. For example, in a certain NR cell, the wireless receiving unit 2057 and the wireless transmitting unit 2077 may be individually configured in accordance with the parameter set related to a transmission signal.

The higher layer processing unit 201 outputs an uplink data (transport block) to the control unit 203. The higher layer processing unit 201 performs processing on a medium access control (MAC) layer, a packet data convergence protocol (PDCP) layer, a radio link control (RLC) layer, and a radio resource control (RRC) layer. Furthermore, the higher layer processing unit 201 generates control information for controlling the receiving unit 205 and the transmitting unit 207 and outputs the generated control information to the control unit 203.

On the basis of the control information from the higher layer processing unit 201, the control unit 203 controls the receiving unit 205 and the transmitting unit 207. The control unit 203 generates control information for the higher layer processing unit 201 and outputs the generated control information to the higher layer processing unit 201. The control unit 203 receives a decoded signal from the decoding unit 2051 and a channel estimation result from the channel measuring unit 2059. The control unit 203 outputs a signal to be encoded to the encoding unit 2071. Furthermore, the control unit 203 may be used for controlling the terminal device 200 in whole or in part.

The higher layer processing unit 201 performs processing and management related to RAT control, radio resource control, subframe setting, scheduling control, and/or CSI report control. The processing and management in the higher layer processing unit 201 are performed on the basis of predetermined settings and/or settings based on the control information specified or provided as notification by the base station device 100. For example, the control information from the base station device 100 includes an RRC parameter, a MAC control element, or DCI. Furthermore, the processing and management in the higher layer processing unit 201 may be performed individually in accordance with the RAT. For example, the higher layer processing unit 201 performs the processing and management separately between LTE and NR.

The RAT control in the higher layer processing unit 201 provides management related to the RAT. For example, the RAT control provides management related to LTE and/or management related to NR. The management related to NR includes setting and processing of a parameter set related to transmission signals in an NR cell.

In the radio resource control in the higher layer processing unit 201, setting information in the terminal device 200 is managed. In the radio resource control in the higher layer processing unit 201, uplink data (transport blocks), system information, RRC messages (RRC parameters), and/or MAC control elements (CEs) are generated and/or managed.

In the subframe setting in the higher layer processing unit 201, subframe settings in the base station device 100 and/or another base station device 100 different from the base station device 100 are managed. The subframe settings include uplink or downlink settings for the subframe, subframe pattern settings, uplink-downlink settings, uplink reference UL-DL settings, and/or downlink reference UL-DL settings. Note that the subframe setting in the higher layer processing unit 201 is also referred to as terminal subframe setting.

In the scheduling control in the higher layer processing unit 201, control information for performing control related to scheduling on the receiving unit 205 and the transmitting unit 207 is generated on the basis of the DCI (scheduling information) from the base station device 100.

In the CSI report control in the higher layer processing unit 201, control related to the CSI reporting to the base station device 100 is performed. For example, in the CSI report control, settings regarding the CSI reference resource to be estimated for calculating the CSI in the channel measuring unit 2059 are controlled. In the CSI report control, a resource (timing) used for reporting the CSI is controlled on the basis of DCI and/or RRC parameters.

Under control of the control unit 203, the receiving unit 205 receives a signal transmitted from the base station device 100 via the transceiver antenna 209, further performs reception processing on the signal such as demultiplexing, demodulation, and decoding, and outputs the information that has undergone the reception processing to the control unit 203. Note that the receiving unit 205 performs the reception processing on the basis of predefined settings or the notification or settings provided by the base station device 100.

The wireless receiving unit 2057 performs, on the uplink signal received via the transceiver antenna 209, conversion into an intermediate frequency (down-conversion), removal of an unnecessary frequency component, control of the amplification level to keep the signal at an appropriate level, quadrature demodulation based on an in-phase component and a quadrature component of the received signal, conversion from an analog signal into a digital signal, removal of guard interval (GI), and/or extraction of a signal in the frequency domain through a fast Fourier transform (FFT).

The demultiplexing unit 2055 separates a downlink channel such as PHICH, PDCCH, EPDCCH, or PDSCH, a downlink synchronization signal, and/or a downlink reference signal from the signal input from the wireless receiving unit 2057. The demultiplexing unit 2055 outputs the downlink reference signal to the channel measuring unit 2059. The demultiplexing unit 2055 compensates for the propagation path for the downlink channel on the basis of the estimated value of the propagation path as input from the channel measuring unit 2059.

The demodulating unit 2053 demodulates, for the downlink channel modulation symbol, the received signal by using a modulation scheme such as BPSK, QPSK, 16QAM, 64QAM, or 256QAM. The demodulating unit 2053 demultiplexes and demodulates a MIMO-multiplexed downlink channel.

The decoding unit 2051 performs decoding processing on the encoded bits of the demodulated downlink channel. The decoded downlink data and/or downlink control information is output to the control unit 203. On PDSCH, the decoding unit 2051 performs decoding processing for each transport block.

The channel measuring unit 2059 measures the estimated value of the propagation path, the channel quality, and/or the like from the downlink reference signal input from the demultiplexing unit 2055, and outputs the measurements to the demultiplexing unit 2055 and/or the control unit 203. The downlink reference signal used by the channel measuring unit 2059 for measurement may be determined on the basis of at least the transmission mode set by the RRC parameter and/or another RRC parameter. For example, DL-DMRS is used for measuring the estimated value of the propagation path for propagation path compensation on PDSCH or EPDCCH. CRS is used for measuring the estimated value of the propagation path for propagation path compensation on PDCCH or PDSCH and/or the downlink channel for reporting CSI. CSI-RS is used for measuring the downlink channel for reporting CSI. The channel measuring unit 2059 calculates reference signal received power (RSRP) and/or reference signal received quality (RSRQ) on the basis of the CRS, the CSI-RS, or the detection signal, and outputs the result to the higher layer processing unit 201.

Under control of the control unit 203, the transmitting unit 207 performs transmission processing, such as encoding, modulation, and multiplexing, on the uplink control information and uplink data as input from the higher layer processing unit 201. For example, the transmitting unit 207 generates and multiplexes an uplink channel such as PUSCH or PUCCH and/or an uplink reference signal to generate a transmission signal. Note that the transmitting unit 207 performs the transmission processing on the basis of predefined settings or the settings or notification provided by the base station device 100.

The encoding unit 2071 encodes the HARQ indicator (HARQ-ACK), the uplink control information, and the uplink data input from the control unit 203 using a predetermined coding scheme such as block coding, convolutional coding, turbo coding, or the like. The modulating unit 2073 modulates the encoded bits input from the encoding unit 2071 using a predetermined modulation scheme such as BPSK, QPSK, 16QAM, 64QAM, or 256QAM. The uplink reference signal generating unit 2079 generates an uplink reference signal on the basis of, for example, an RRC parameter set in the terminal device 200. The multiplexing unit 2075 multiplexes the modulation symbol and the uplink reference signal of each channel and places the resultant in a predetermined resource element.

The wireless transmitting unit 2077 performs processing on the signal from the multiplexing unit 2075, such as conversion into a signal in the time domain through an inverse fast Fourier transform (IFFT), addition of guard interval, generation of a baseband digital signal, conversion into an analog signal, quadrature modulation, conversion from a signal having an intermediate frequency into a signal having a high frequency (up-conversion), removal of an extra frequency component, and amplification of power to generate a transmission signal. The transmission signal output from the wireless transmitting unit 2077 is transmitted through the transceiver antenna 209.

3. DRONE 3.1. Use Cases

A drone may have a variety of use cases. The following describes some examples of typical use cases.

Entertainment

For example, in one possible use case, a camera is attached on a drone to take bird's eye view photographs, moving images, and the like. In recent years, it has become possible to easily take images from a viewpoint that has conventionally posed difficulty on the ground, such as dynamically capturing images of sporting activities.

Transportation and Package Delivery

For example, a drone may be caused to carry a package in a possible use case. In practice, an attempt to start introducing the service is found.

Public Safety

For example, a drone may be used for monitoring, tracking criminals, or the like in a possible use case. In practice, an attempt to start introducing the service is found.

Search and Rescue

For example, in a possible use case, a drone may be used to search a place difficult for people to enter so as to provide rescue support.

Informative

For example, a drone may be used to provide information in a possible use case. In practice, a drone base station, which is a drone serving as a base station, is already under research and development. By providing wireless services from the sky, a drone base station makes it possible to provide wireless services to the areas having difficulty in laying Internet lines.

Sensing

For example, a drone may be used for land surveying in a possible use case. A drone can achieve efficient surveying by collectively performing surveying works that have conventionally been done by humans.

Worker

For example, a drone may be used as labor force in a possible use case. For example, in agriculture, drones are expected to be utilized in various fields such as agrichemical spraying and pollination.

Maintenance

For example, a drone may be used to provide maintenance services in a possible use case. A drone makes it possible to do maintenance in a place difficult for people to access for checks, such as the back of a bridge.

3.2. Drone Communication

As described above, utilization of drones in various use cases is under study. To implement these use cases, various technical requirements are imposed on drones. Among others, communication may be a particularly important requirement. Since a drone flies freely in a three-dimensional space, wireless communication is conceivably used while the use of wired communication is not practical. Note that example applications of wireless communication may include controlling the drone (that is, remote manipulation) and providing information from the drone.

Communication made by a drone is also referred to as Drone to X (D2X). Communication partners of a drone in the D2X communication may include, for example, another drone, a cellular base station, a Wi-Fi (registered trademark) access point, a television (TV) tower, a satellite, a road side unit (RSU), a human (or a device carried by a human), and the like. A drone can be remotely manipulated via device to device (D2D) communication with a device carried by a human. Furthermore, a drone can also be connected to a cellular system or Wi-Fi for communication. To further broaden coverage, a drone may have communication by being connected to a network in which a broadcast system such as TV is used or to a network in which satellite communication is used. Thus, it is conceived that various communication links may be formed for drones.

3.3. Flight-Related Information

The following describes in detail flight-related information, which is information regarding flight of a drone.

The flight-related information includes information that is measured, sensed, detected, estimated, or recognized when a drone is flying. For example, the flight-related information may include altitude information regarding flight of a drone, battery information regarding the flight, positional information regarding the flight, and/or state information regarding the flight. The flight-related information may include information in which a plurality of pieces of flight-related information is combined.

The altitude information regarding the flight may include information regarding the altitude at which a drone is currently flying, information regarding an altitude at which the drone can fly (that is, a highest altitude and a lowest altitude), and the like. For example, the base station device 100 may determine whether or not beamforming is to be carried out in accordance with the altitude information regarding the drone. Note that the altitude in the present embodiment is preferably a relative altitude with respect to the target base station device (for example, a serving base station or a neighbor base station), but may be an absolute altitude measured from a reference altitude (for example, the sea level).

The battery information regarding the flight may include information regarding the current remaining battery of the drone, information regarding a time for which the drone can fly, information regarding the battery capacity, information regarding power consumed by the drone, and the like. Furthermore, the drone's battery information may include an absolute value such as the capacity and the amount of power, a relative value such as the remaining amount relative to the battery capacity, information based on a percentage or a level obtained by a predetermined calculation, and the like. For example, a drone may decrease the reporting frequency of measurement information to save battery in a case where the remaining battery is low, or conversely increase the reporting frequency of measurement information to prevent a hazard in a case where the remaining battery is low.

The positional information regarding the flight may include information regarding latitude and longitude, information indicating a relative position from a site such as a predetermined base station device 100 or a predetermined reference point, information indicating whether or not the drone is within a predetermined area, and the like. For example, the drone may increase the reporting frequency of measurement information in a case of flying near a flight prohibited area.

The state information regarding the flight (hereinafter also referred to as flight state information) may include information indicating whether the drone is flying or stopped, information indicating whether the drone is in a flight by manual maneuvering or in a flight by automatic maneuvering (autonomous flight), information indicating whether or not a propeller of the drone is rotating, information indicating whether or not the drone is grounded on the land or the like, and so on. For example, the drone may increase the reporting frequency of measurement information when the drone is flying and decrease the reporting frequency of the measurement information when the drone is stopped.

Moreover, the flight-related information regarding the flight may include information regarding the direction (azimuth), speed, and/or altitude that is set for the flight to be made by the drone. Such information is also referred to as a flight path. The flight path may be provided to the base station device 100 that controls the radio resource control. On the basis of the flight path, the base station device 100 performs the radio resource control for the drone. Examples of the method for providing a flight path include a method by which the flight path is provided by the drone itself, a method by which the flight path is provided by an operator (or a control device) connected to a local network, a method by which the flight path is provided by an air traffic control station (or an air traffic control device) through a cellular network, or a combination of the aforementioned methods.

Furthermore, the flight-related information may include information regarding accuracy or reliability of each piece of information, such as altitude information, the accuracy or reliability being dependent on the drone or environment. For example, the information regarding accuracy or reliability that depends on the drone includes information based on precision of the sensor included in the drone. The information regarding accuracy or reliability that depends on the environment includes information based on weather, atmospheric temperature, wind speed, or atmospheric pressure.

3.4. Definition of Aerial User Equipment

The following provides definition of aerial user equipment in the present embodiment and lists differences from terrestrial user equipment. In the present embodiment, a terminal device having one or more of the following features can be regarded as the aerial user equipment.

(1) Flight Mode

For example, in a case where a terminal device is flying (away from the ground), the terminal device can be regarded as the aerial user equipment. By contrast, in a case where a terminal device is not flying (in contact with the ground), the terminal device can be regarded as the terrestrial user equipment.

(2) Altitude

For example, in a case where a terminal device is present at a position higher than a predetermined altitude, the terminal device can be regarded as the aerial user equipment. By contrast, in a case where a terminal device is present at position lower than a predetermined altitude, the terminal device can be regarded as the terrestrial user equipment.

(3) Flight Ability

For example, in a case where a terminal device has the ability to fly, the terminal device can be regarded as the aerial user equipment. By contrast, in a case where a terminal device does not have the ability to fly, the terminal device can be regarded as the terrestrial user equipment.

(4) Settings Related to Drone Communication

For example, in a case where settings related to drone communication are made on a terminal device, the terminal device can be regarded as the aerial user equipment. By contrast, in a case where no settings related to drone communication are made on a terminal device, the terminal device can be regarded as the terrestrial user equipment. Note that examples of the information necessary for flight includes system information for drone communication, dedicated RRC settings for drone communication, and the like.

(5) Functions Related to Aerial User Equipment

For example, in a case where a terminal device has a function related to aerial user equipment and is equipped with a circuit implementing the function, the terminal device can be regarded as the aerial user equipment. By contrast, in a case where a terminal device does not have a function related to aerial user equipment and is not equipped with a circuit implementing the function, the terminal device can be regarded as the terrestrial user equipment. Examples of the function related to aerial user equipment include a function of receiving a virtual cell provided to aerial user equipment. Whether or not the terminal device has a function related to aerial user equipment may be defined by capability or may be defined by terminal device category.

4. TECHNICAL FEATURES

Technical features of the present embodiment will now be described in detail.

4.1. Beamforming

In general, without beamforming (beam, beamform, or directivity control), base station devices and terminal devices each emit radio waves in all directions. On the other hand, beamforming makes it possible to emit radio waves in a specific direction so that radial emission of the radio waves can be controlled.

To achieve flexible beamforming, a device needs to be equipped with a directional antenna (adaptive antenna) that includes a plurality of antenna elements. The beam width is narrower and the beamforming gain is higher depending on the number of antenna elements. On the other hand, in general, the spacing between antenna elements is designed with reference to the half wavelength of the carrier frequency. Therefore, in general, a directional antenna that contains a large number of antenna elements to achieve a high beamforming gain occupies a large area (volume). Furthermore, a high-performance directional antenna capable of flexible directivity control requires a high-precision phase control device, and therefore is of high grade (expensive and costly).

In the conventional LTE (Release 14 or earlier), downlink FD-MIMO is standardized but uplink FD-MIMO is not standardized. Specifically, CSI-RS is beamformed in LTE. The terminal device feeds back the beamformed CSI-RS as a CSI-RS resource set indicator (CRI), whereby the base station device can recognize suitable beamforming for the terminal device. On the other hand, in the conventional LTE, SRS and others are not beamformed for reasons including the load imposed on the terminal.

In view of a communication device having a limited antenna mounting area (volume) such as a smartphone and other major use cases of the conventional cellular communication, it is quite unlikely that such a communication device is equipped with a large and high-performance antenna. On the other hand, it would be highly possible that a communication device like the above-described drone is equipped with a large and high-performance antenna. Therefore, it is conceived that uplink FD-MIMO may be introduced for a terminal device that is equipped with a high-performance antenna (directional antenna, for example). Furthermore, if the terminal device includes a directional antenna, beamforming can also be applied to SRS, PUSCH, PUCCH, and PRACH.

The beam information regarding SRS is indicated by an SRS resource set indicator (SRI). Beams are different between different SRS resource sets. In other words, the terminal device uses the same beam for SRSs in the same SRS resource set, and uses another beam for SRSs in another SRS resource set. When instructing the terminal device to perform PUSCH transmission, the base station device indicates a specific SRS resource corresponding to the beam to be used for the transmission. Upon receipt of the indication of the SRS resource, the terminal device determines the beam for PUSCH.

In this way, assuming that the terminal device includes a high-performance antenna like a directional antenna, the present embodiment introduces the capability regarding mounting of an antenna (information regarding a mounting function, information regarding capability, and information regarding whether or not a test has been conducted). That is, there will conceivably be a mixture of terminal devices equipped with directional antennas and terminal devices not equipped with directional antennas on a network. Concerning drones alone, it is naturally imagined that there will be a mixture of drones equipped with directional antennas and drones not equipped with directional antennas. It is conceivably difficult to mandate that all the drones are equipped with expensive directional antennas. Specifically, a large-sized and expensive drone can be equipped with a directional antenna. On the other hand, it is difficult to mount a directional antenna on a small-sized drone. Therefore, it is desirable to assume that at least two types of drone terminals, the drones equipped with directional antennas and the drones not equipped with directional antennas, are present on a network.

The terminal device 200 reports the capability regarding an antenna to the base station device 100. The base station device 100 changes control of transmission power in accordance with the capability. For example, the base station device 100 sends an instruction to switch, in accordance with the capability information, between the transmission power control for a terminal device equipped with a directional antenna as described below and the uplink transmission power control for a terminal device not equipped with a directional antenna.

(Transmission Power Control for Terminal Device Equipped with Directional Antenna)

A terminal device equipped with a directional antenna can reduce transmission power. The transmission power can be reduced by making an antenna gain reflected in the equation for transmission power control.

As an example, the antenna gain of a directional antenna is included in the path loss for calculation. The antenna gain included in the path loss for calculation is advantageous in that the equation does not need to be changed. On the other hand, the antenna gain is also affected by the alpha coefficient. Basically, the alpha coefficient is controlled by the base station (network) in response to the path loss (the position of the terminal device). In a case where a factor other than the path loss is included, it becomes difficult to accurately control the uplink transmission power.

Furthermore, although the downlink path loss calculated from RSRP of CRS or CSI-RS is used for transmission power control, the transmission power can be more accurately controlled by using the uplink path loss that includes an antenna gain of the terminal device. For example, the terminal device 200 transmits a beamformed SRS. The base station device 100 receives the SRS from the terminal device 200 and measures the path loss. Then, the base station device 100 notifies the terminal device 200 of the measured uplink path loss via RRC signaling. In this way, the base station device 100 is enabled to perform the uplink power control for the terminal device 200 in accordance with more accurate path loss. Note that the uplink transmission power is determined on the basis of the downlink path loss until notification of the uplink path loss is given.

For the transmission power control, a new term regarding an antenna gain may be added. Adding a new term regarding an antenna gain is advantageous in that the base station device 100 can accurately control the transmission power of the terminal device 200.

The load on the terminal device 200 can be reduced by the base station device 100 indicating to the terminal device 200 a limited number of candidate beams to be processed. For example, the base station device 100 is basically located downward as seen from a flying drone (aerial user equipment). Accordingly, the flying drone performs transmission and reception in lower directions. Thus, the flying drone is less likely to be required to calculate, transmit, or feed back beamforming so as to perform transmission and reception in upper directions. Therefore, the terminal device 200 can apply codebook restriction. Specifically, the terminal device 200 can reduce the load thereon not by processing upward beams but by processing downward beams only. The application of codebook restriction may be indicated by the base station device 100 through RRC signaling, or may be determined by the terminal device 200 in accordance with a predetermined condition. Examples of the predetermined condition include the altitude of the terminal device 200, the angle of arrival of a downlink signal from the serving cell, and so on.

Furthermore, in the present embodiment, uplink inter-cell interference can be further reduced by sharing the information regarding uplink interference beams between base station devices via the X2 interface. Specifically, the information regarding uplink interference beam is included in OI or HII and transmitted/received between base station devices.

Examples of the information regarding uplink interference beams include an angle of arrival (AoA), resource information (SRI, for example), the index of a codebook applied to a precoder for uplink transmission, and quasi co-location (QCL) information with respect to a signal transmitted by a reference beam. The uplink interference beam is indicated for each resource block or for each physical resource block bundling (PRB bundling) of predetermined successive resource blocks.

Furthermore, the base station device 100 can send to the terminal device 200 an instruction to restrict the uplink beams that can be sent. For example, the base station device 100 can provide, by notification, the terminal device 200 with the information regarding the uplink beams that can be (or cannot be) sent. On the basis of the information regarding the beams that can be sent, the terminal device 200 determines an uplink beam and transmits PUCCH, PUSCH, SRS, and/or the like. It is desirable that notification of the information regarding the beams that can be sent is dynamically given by PDCCH or the like. Examples of the information regarding the beams that can be sent include a set of SRIs, QCL information with respect to a signal transmitted by a reference beam, a set of codebook indices, and an angle of departure (AoD).

After the initial access to the base station device 100, the terminal device 200 may report the capability regarding whether or not beam correspondence can be done when reporting the capability regarding mounting of a directional antenna to the base station. Beam correspondence, which indicates a state in which channel reciprocity can be applied between downlink and uplink, refers to the information indicating whether or not the antenna on the terminal device has been calibrated for downlink and uplink.

The capability regarding a directional antenna may further include an antenna gain provided on the terminal device 200. As a result, the transmission power of the terminal device 200 can be reduced on the base station device 100 side by using P0 or the like. The capability regarding a directional antenna may further include an antenna pattern on the terminal. As a result, the base station device 100 can be aware of the antenna gain on the terminal device 200 including an angular direction.

(Transmission power control for terminal device not equipped with directional antenna or during initial access)

As described above, transmission power can be controlled on the basis of the capability regarding mounting of an antenna. However, the problem of uplink interference is still unsolved during a time period of initial access that takes place before the capability regarding mounting of an antenna is sent and on a terminal that does not have the capability regarding mounting of an antenna. For example, during initial access, transmission of PRACH and PUSCH including a message (Msg3) and the like take place. Therefore, the interference control, in other words the uplink transmission power control, needs to be performed during initial access and on a terminal device equipped with an omnidirectional antenna.

(1. Transmission Power Control in Accordance with Altitude)

A drone can fly at an altitude of, for example, about 100 m. The inter-cell interference caused by radio waves emitted from a drone is more significant at a higher altitude. Therefore, in a case where the terminal device 200 rises to a higher altitude, the base station device 100 exerts control so that transmission is made with lower power than usual. Furthermore, for example, in a case where the altitude difference between the base station device 100 and the terminal device 200 becomes greater, the base station device 100 exerts control so that transmission is made with lower power than usual.

A new term corresponding to an altitude is added to the equation for PUSCH transmission power control. In addition, the alpha coefficient in the equation for transmission power control is changed from a constant to a predetermined function (for example, a function corresponding to a distance or a path loss value). Since the environment in the air is almost a line-of-sight (LOS) environment, the path loss is not reduced significantly in spite of a longer distance. Therefore, for transmission power control, the base station device 100 may reduce the transmission power by increasing the reduction coefficient in a case where the path loss has slightly decreased. An example of the reduction coefficient will be described later.

Furthermore, the base station device 100 may preset a plurality of $P_O$s corresponding to altitudes by RRC signaling. The terminal device 200 may determine the transmission power using the value of $P_O$ corresponding to the altitude. An example of the value of $P_O$ will be described later. Settings of transmission power parameters for initial access may be included in, for example, the system information for drone communication (master information block (MIB) or (system information block (SIB)). Settings of transmission power parameters for the terminal device 200 that does not support the antenna capability are made by RRC signaling.

(2. Transmission Power Control in Accordance with Amount of Interference)

The terminal device 200 is controlled to reduce the transmission power on the basis of the interference information received from a neighbor cell. It is desirable that the offset term for reducing the interference power is dynamically controlled. For example, the value of the offset term may be included in the PDCCH specific to a UE (uplink grant, for example), or may be included in the PDCCH shared by UEs or the PDCCH shared by UE groups (TCP command, for example). For example, a set of values of the offset term is set by RRC signaling, and an applied value of the offset term is indicated by PDCCH. Furthermore, since the amount of interference varies with the frequency, the transmission power of the terminal device 200 may also be changed in accordance with the frequency. For the same PUSCH, the transmission power of the terminal device 200 may differ among, for example, resource blocks or among consecutive resource blocks or resource block groups (RBGs). In the power control information sent from the base station device 100 to the terminal device 200, an absolute value for each frequency may be assigned, or a relative value with respect to a reference frequency may be assigned.

The terminal device 200 can improve the SINR by repeatedly performing transmissions in place of a decrease in transmission power to lower the SINR per transmission. That is, the above-described transmission power control settings and repeated transmission settings may be made at the same time.

(3. Uplink Resource Control)

One method of avoiding inter-cell interference includes making uplink resources orthogonal between cells. For example, RACH settings for the terminal device equipped with an omnidirectional antenna and RACH settings for the terminal device equipped with a directional antenna can be configured.

The RACH settings for the terminal device equipped with an omnidirectional antenna are contained in a conventional SIB2. On the other hand, the RACH settings for the terminal device equipped with a directional antenna may be contained in an SIB for aerial user equipment. Furthermore, the RACH resource for terrestrial user equipment may be different from the RACH resource for aerial user equipment. That is, the resources used by the terminal device 200 may be switched in accordance with the altitude of the terminal device 200. Furthermore, the uplink component carrier for a drone terminal may be different from the component carrier for a terminal. The correspondence between the downlink component carrier and the uplink component carrier may be contained in an SIB for aerial user equipment. Furthermore, different PUCCH and PUSCH resources may be set between resources for terrestrial user equipment and resources for aerial user equipment.

In the present embodiment, a virtual cell different from the physical cell may be set in the air. The terminal device can recognize a virtual cell by an identifier (virtual cell identify (VCI)) used for identifying a virtual cell. The base station device notifies the terminal device of a set (table) of virtual cell identifiers by using broadcast information. Depending on the set of virtual cell identifiers and the environment of the terminal device, virtual cells to which the terminal device is to be connected are switched. Setting the virtual cells reduces inter-cell interference and cell disruption in a coverage area in the air to improve communication quality and connection stability.

The virtual cell can be regarded as a unit of settings of a radio resource or a reference of a transmission/reception point. The terminal device is capable of receiving RRC settings that are different among virtual cells. For example, each virtual cell independently has PDCCH settings, EPDCCH settings, RACH settings, and PUCCH settings that can be set in the terminal device. The terminal device assumes that signals transmitted from different virtual cells are transmitted from different transmission/reception points. The virtual cells of the present embodiment are three-dimensionally configured. For example, different virtual cells may be set at the same position but at different altitudes. Furthermore, an SIB for aerial user equipment may be associated with a virtual cell identifier. Virtual cells are set in the air and resources are controlled for each virtual sell, thereby achieving appropriate cell connection processing and inter-cell interference control.

Figure 9:
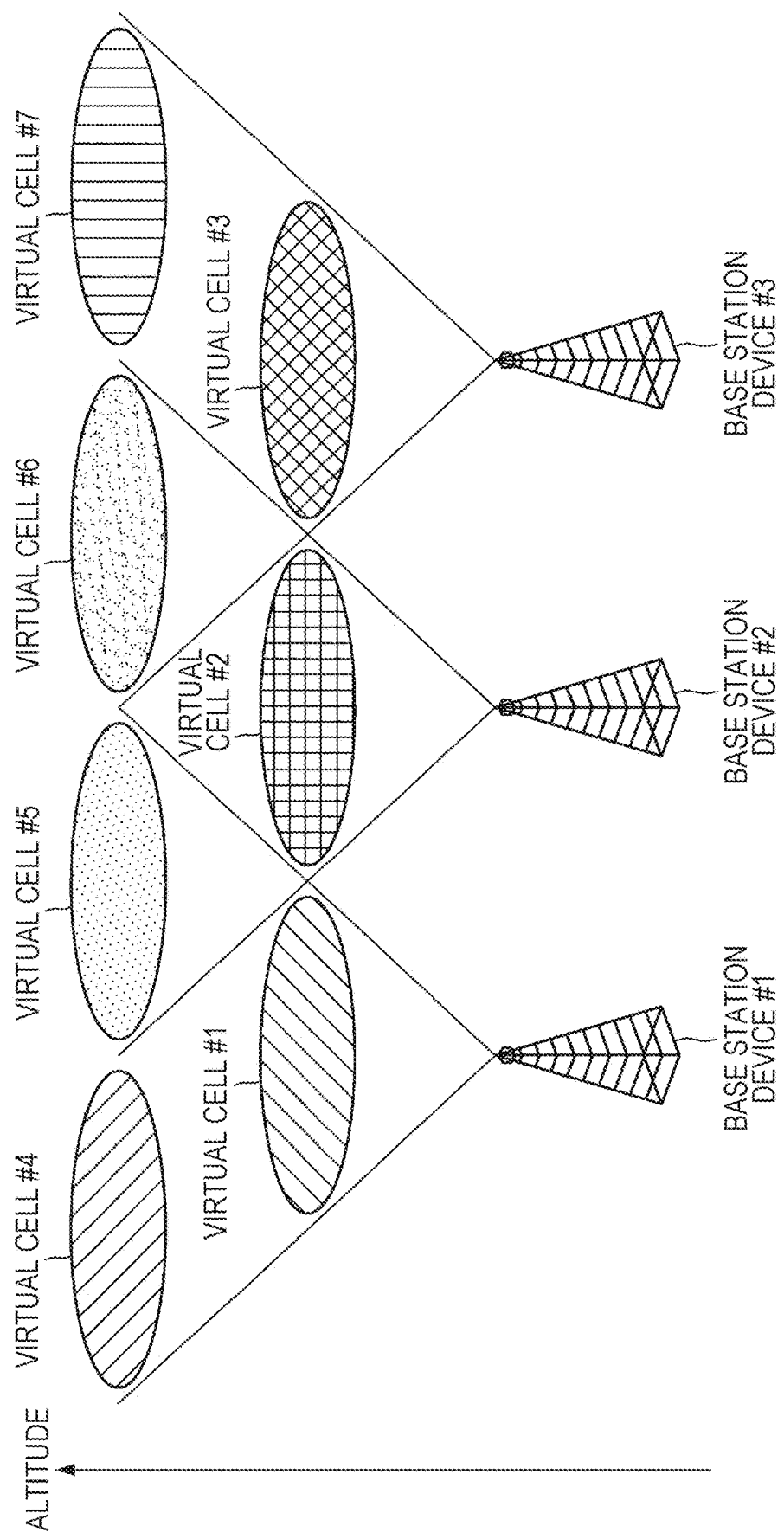
FIG. 9 is a diagram illustrating an example of deployment of virtual cells.

In an example of virtual cell deployment, a virtual cell is set for each region where a plurality of physical cells are superimposed on each other. A specific example is described below with reference to FIG. 9. In a lower altitude space, virtual cells #1 to #3 are provided from the base station devices #1 to #3. In addition, virtual cells #4 to #7 are provided in a higher altitude space. The virtual cell #5 is provided in an area where the coverages of the base station device #1 and the base station device #2 are superimposed on each other. The virtual cell #6 is provided in an area where the coverages of the base station device #2 and the base station device #3 are superimposed on each other.

Virtual cells are set in the air and resources are controlled for each virtual sell, thereby achieving appropriate cell connection processing and inter-cell interference control.

Note that virtual cells can be set so as to be superimposed on each other. For example, a virtual cell for a terminal device moving at lower speed and a virtual cell for a terminal device moving at higher speed are provided in a superimposed manner.

An identifier for identifying a virtual cell (virtual cell identifier or virtual cell ID) may be assigned to a virtual cell. The terminal device performs transmission and reception to and from a virtual cell using the virtual cell identifier in addition to the physical cell identifier.

Figure 10:
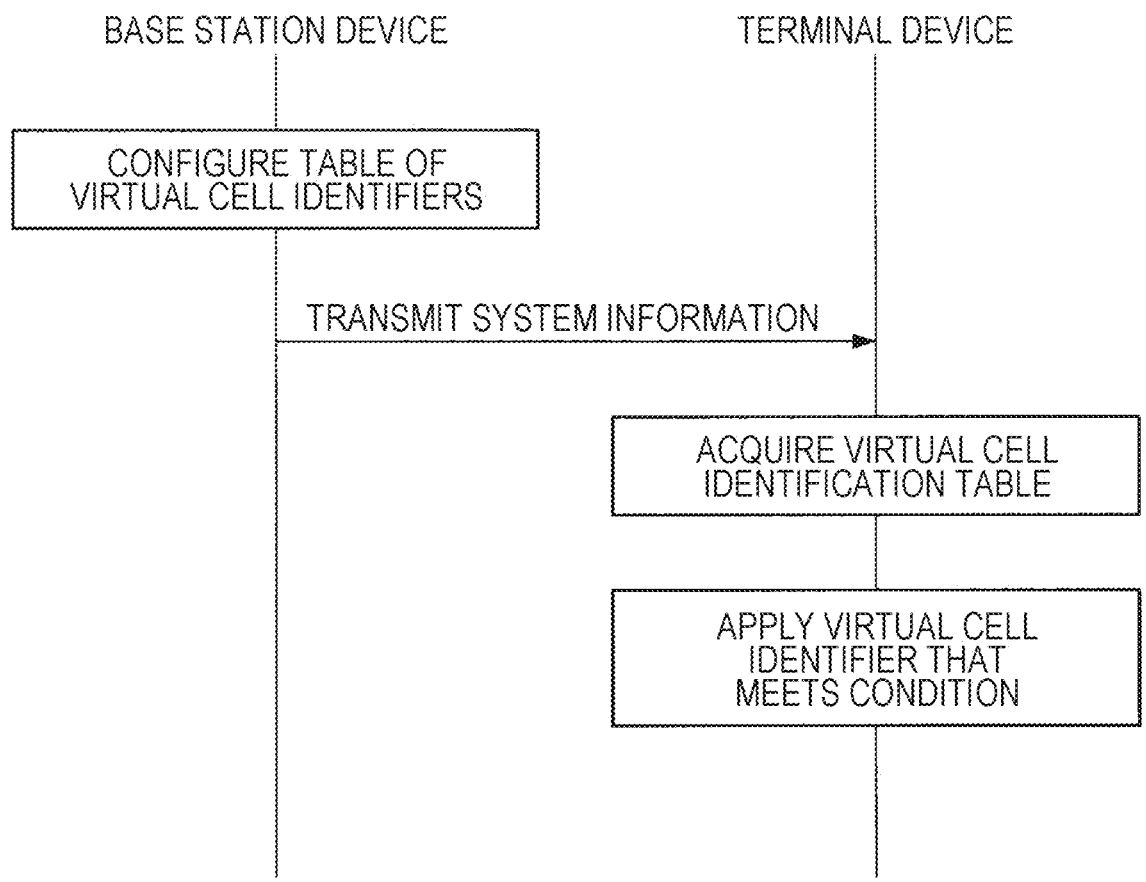
FIG. 10 is a diagram illustrating an example of a sequence of setting a virtual cell identifier.

FIG. 10 is a diagram illustrating an example of a sequence of setting a virtual cell identifier. First, the base station device configures a table of virtual cell identifiers. Then, the base station device notifies the terminal device of the table of virtual cell identifiers. The terminal device acquires the virtual cell identifier table and selects a virtual cell identifier to be applied in accordance with selection criteria.

Figure 11:
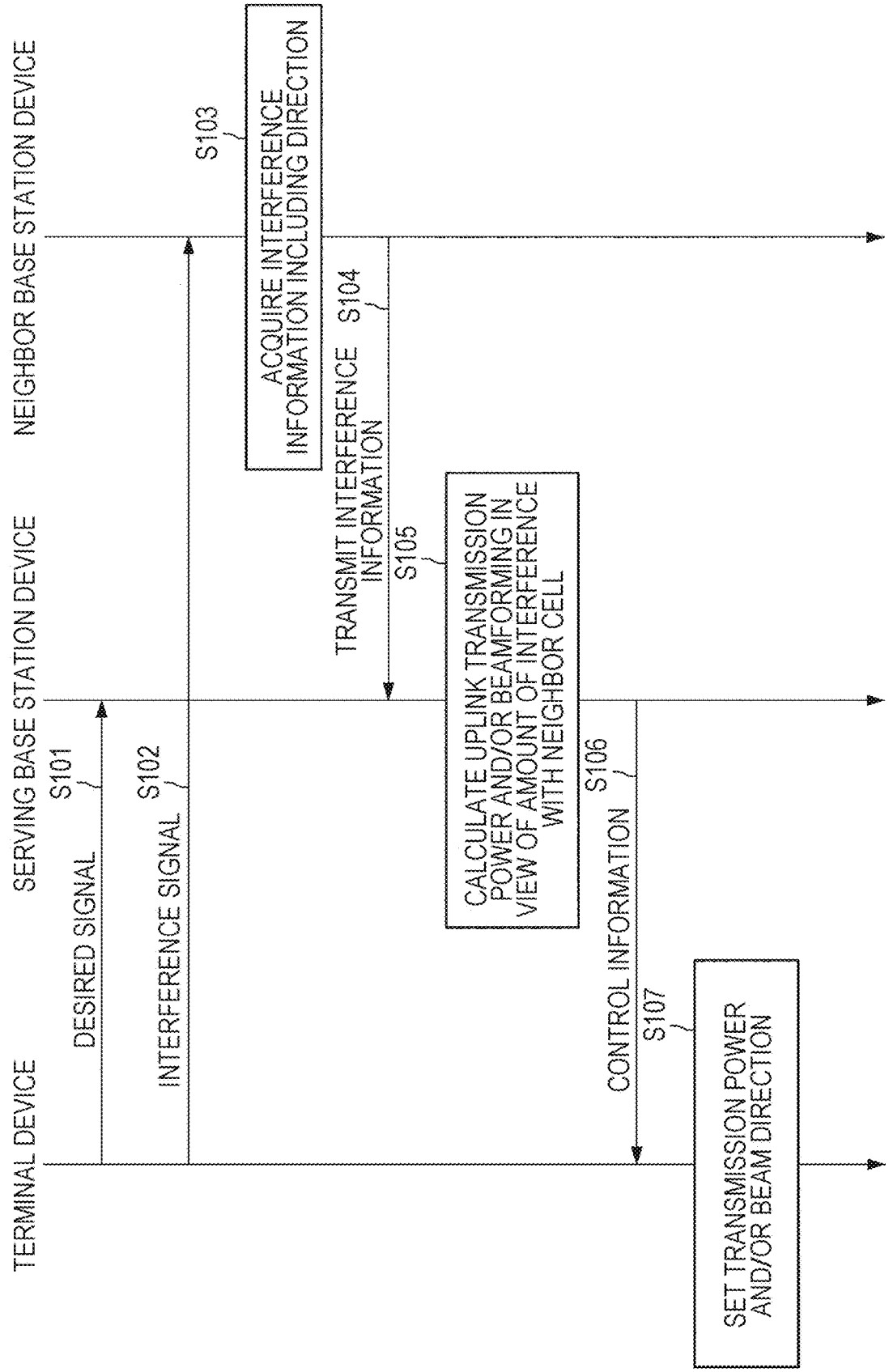
FIG. 11 is a flow diagram illustrating example operations of a wireless communication system according to an embodiment of the present disclosure.

Now, with reference to the drawings, the following describes example operations of a wireless communication system in which the base station device and the communication device according to an embodiment of the present disclosure communicate with each other. FIG. 11 is a flow diagram illustrating example operations of the wireless communication system according to an embodiment of the present disclosure.

FIG. 11 shows the terminal device 200 that is floating, the base station device 100 (serving base station device) that is communicating with the terminal device 200, and the base station device 100 (neighbor base station device) that is not communicating with the terminal device 200. The terminal device 200 is outputting a desired signal for the serving base station device to the serving base station device (step S101). However, to the neighbor base station device, the terminal device 200 is outputting an interference signal constituting interference with the neighbor base station device (step S102).

The neighbor base station device acquires interference information pertaining to the interference signal including the angle of arrival (step S103), and transmits the acquired interference information to the serving base station device (step S104).

In view of the amount of interference with the neighbor cell (interference caused by the neighbor base station device with the cell), the serving base station device calculates the uplink transmission power and/or the beamforming for the terminal device 200 (step S105). The calculation may be done by, for example, the control unit 103.

Then, the serving base station device transmits the result of calculating the uplink transmission power and/or the beamforming to the terminal device 200 as the control information for the terminal devices 200 (step S106). On the basis of the control information sent from the serving base station device, the terminal device 200 sets the uplink transmission power and/or the beam direction (step S107). For setting the uplink transmission power and/or the beam direction, the terminal device 200 uses the information regarding an altitude of the terminal device 200.

Figure 12:
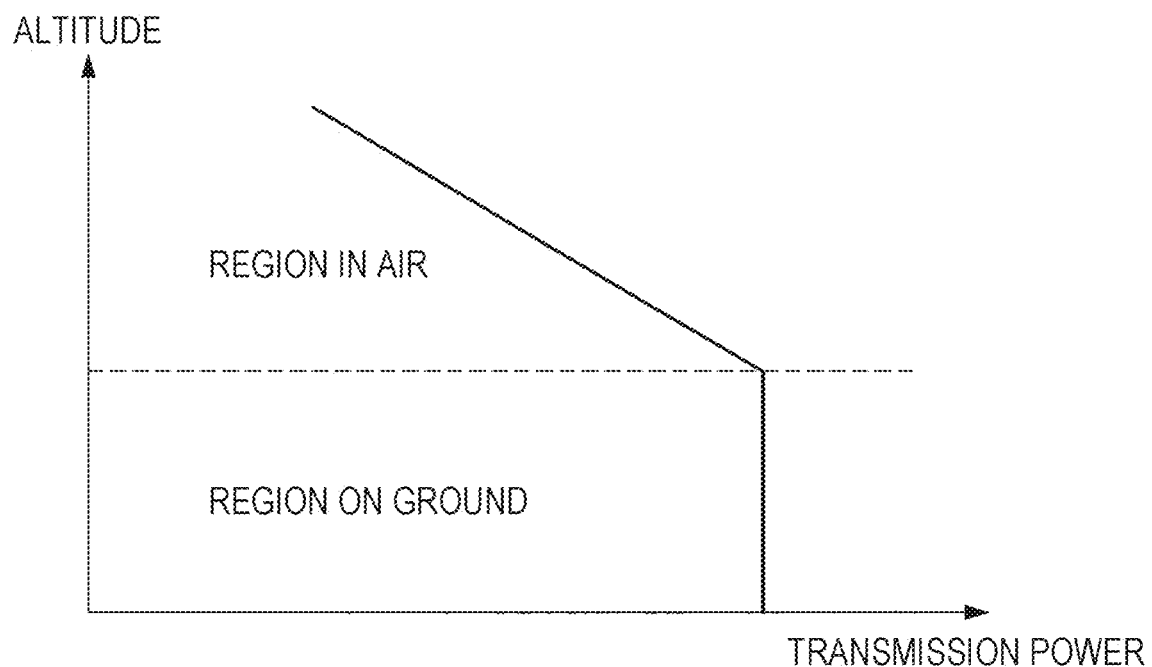
FIG. 12 is an explanatory diagram illustrating an example of a relationship between the altitude of a terminal device and the uplink transmission power of the terminal device.

For the above-described transmission power control in accordance with the altitude, the transmission power may be controlled so as to become lower as the terminal device 200 is at a higher altitude. FIG. 12 is an explanatory diagram illustrating an example of a relationship between the altitude of the terminal device 200 and the uplink transmission power of the terminal device 200. If the terminal device 200 is located at a position lower than a certain altitude, the base station device 100 may determine that the terminal device 200 is in the ground region to keep the transmission power constant. On the other hand, if the terminal device 200 is located at a position equal to or higher than a certain altitude, the base station device 100 may determine that the terminal device 200 is in the air region to change the transmission power in accordance with the altitude. In the example in FIG. 12, if the terminal device 200 is at a position equal to or higher than a certain altitude, the altitude and the uplink transmission power of the terminal device 200 are in a proportional relationship. Needless to say, the relationship between the altitude and the uplink transmission power of the terminal device 200 is not limited to the example.

Figure 13:
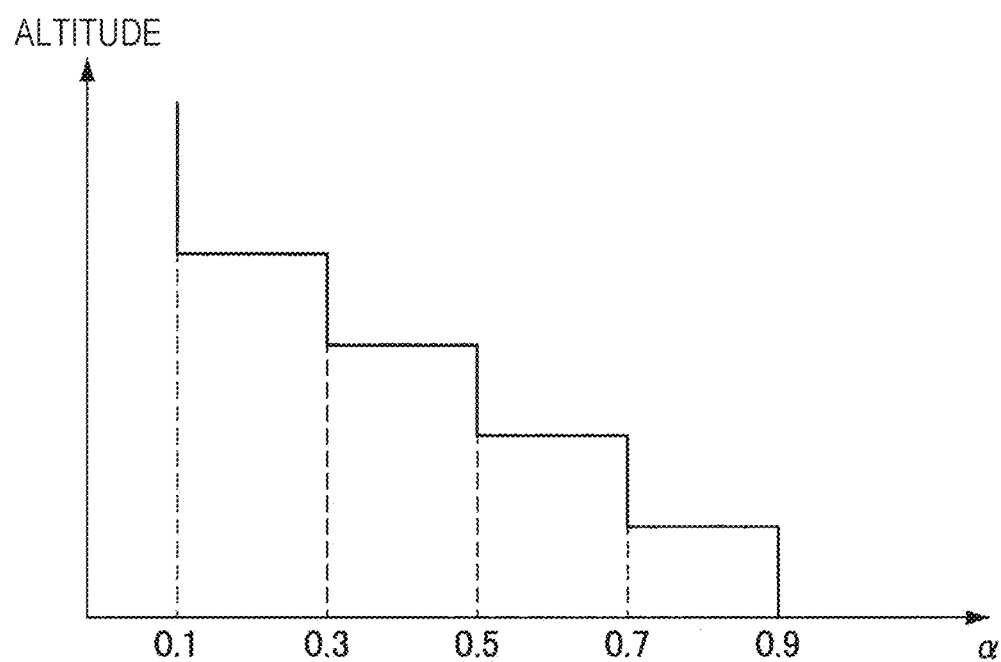
FIG. 13 is an explanatory diagram illustrating an example of a relationship between the altitude of a terminal device and the coefficient in a mathematical equation for transmission power control.

Examples of the coefficient α to be used for the above-described transmission power control in accordance with the altitude are shown. FIG. 13 is an explanatory diagram illustrating an example of a relationship between the altitude of the terminal device 200 and the coefficient α in the above-described mathematical equation for transmission power control. In this way, values of the coefficient α may be set so as to decrease stepwise as the terminal device 200 is at a higher altitude.

Figure 14:
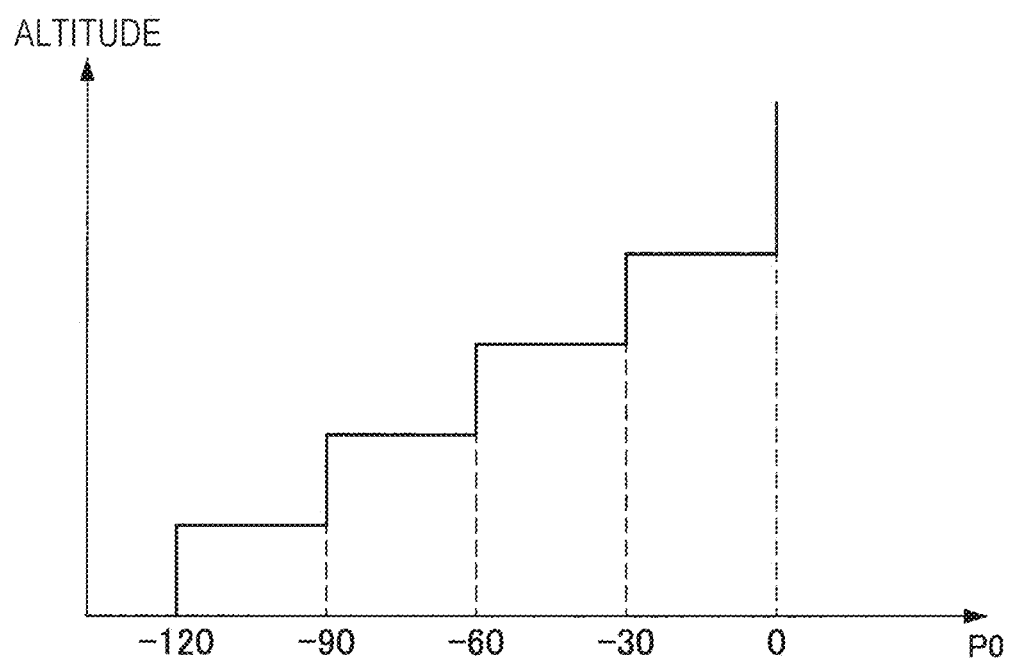
FIG. 14 is an explanatory diagram illustrating an example of a relationship between the altitude of a terminal device and a term in the mathematical equation for transmission power control.

Examples of the term $P_O$ to be used for the above-described transmission power control in accordance with the altitude are shown. FIG. 14 is an explanatory diagram illustrating an example of a relationship between the altitude of the terminal device 200 and the term $P_O$ in the above-described mathematical equation for transmission power control. In this way, values of the term $P_O$ may be set so as to decrease stepwise as the terminal device 200 is at a higher altitude.

All of the control described above can also be applied to sidelink, which is a communication link between terminal devices, and to backhaul link, which is a communication link between base station devices.

5. APPLICATION EXAMPLES

The technology according to the present disclosure can be applied to various products. For example, the base station device 100 may be implemented in any type of evolved Node B (eNB) such as a macro eNB or a small eNB. The small eNB may be an eNB that covers a cell smaller than a macro cell, such as a pico eNB, a micro eNB, or a home (femto) eNB. Alternatively, the base station device 100 may be implemented in other types of base station such as a NodeB or a base transceiver station (BTS). The base station device 100 may include a main entity (also referred to as a base station device) that controls wireless communication and one or more remote radio heads (RRHs) disposed at locations different from the main entity. Furthermore, various types of terminals described below may operate as the base station device 100 by performing a base station function temporarily or semi-permanently.

Furthermore, for example, the terminal device 200 may be implemented in a mobile terminal such as a smartphone, a tablet personal computer (PC), a notebook PC, a portable game terminal, a portable/dongle-type mobile router, or a digital camera or an in-vehicle terminal such as a car navigation device. Furthermore, the terminal device 200 may be implemented in a terminal performing machine-to-machine (M2M) communication (also referred to as a machine type communication (MTC) terminal). Moreover, the terminal device 200 may be a wireless communication module (for example, an integrated circuit module fabricated on a single die) disposed in any of these terminals.

APPLICATION EXAMPLES FOR BASE STATION DEVICE

First Application Example

Figure 15:
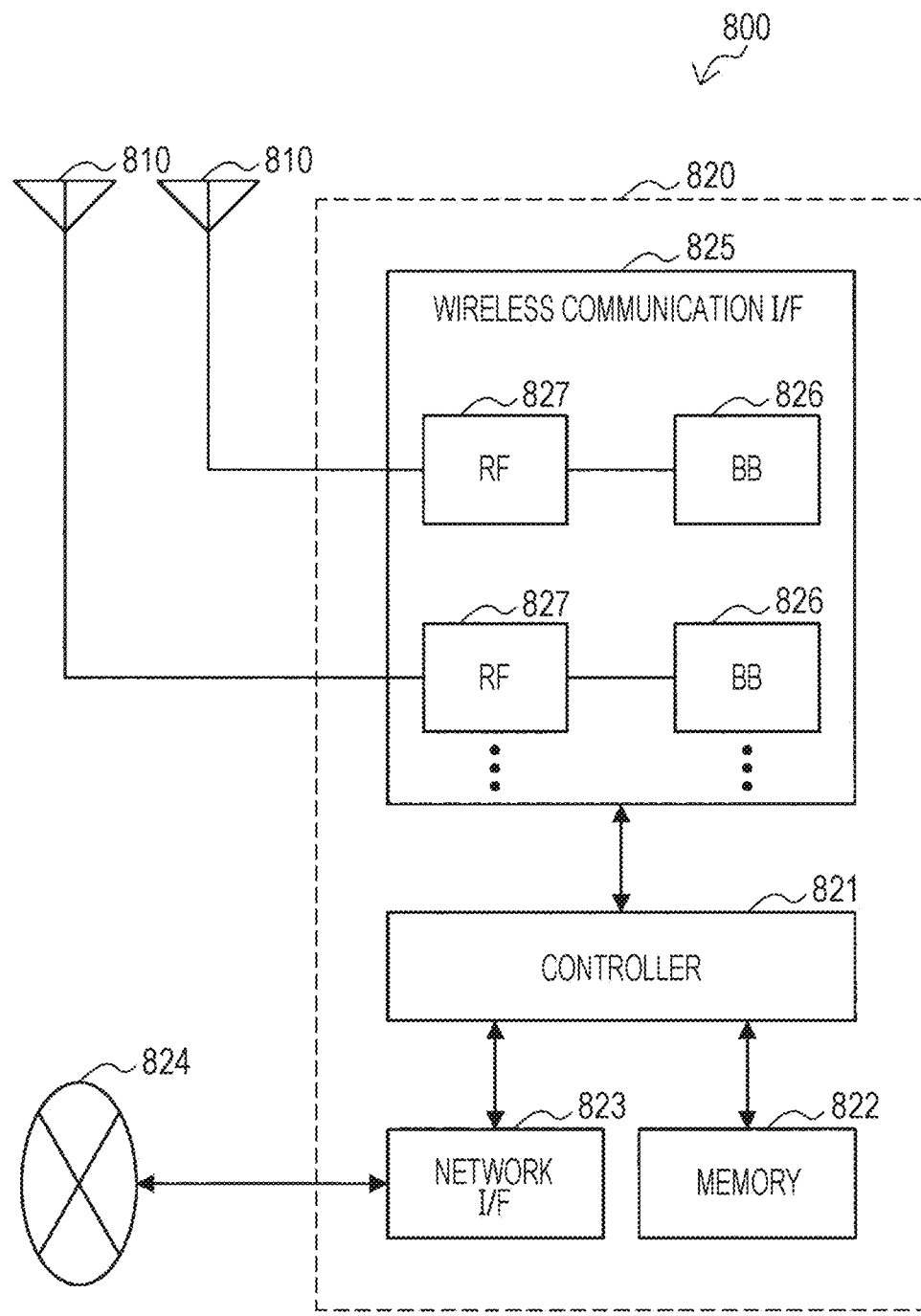
FIG. 15 is a block diagram illustrating a first example of a general configuration of an eNB to which the technology according to the present disclosure can be applied.

FIG. 15 is a block diagram illustrating a first example of a general configuration of an eNB to which the technology according to the present disclosure can be applied. An eNB 800 includes one or more antennas 810 and a base station device 820. Each antenna 810 and the base station device 820 may be connected to each other via an RF cable.

Each of the antennas 810 includes a single or a plurality of antenna elements (for example, a plurality of antenna elements included in a MIMO antenna) and is used for the base station device 820 to transmit and receive a wireless signal. The eNB 800 may include a plurality of the antennas 810 as illustrated in FIG. 15, and the plurality of antennas 810 may, for example, respectively correspond to a plurality of frequency bands used by the eNB 800. Note that while FIG. 15 illustrates an example in which the eNB 800 includes a plurality of antennas 810, the eNB 800 may include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors and transfer the generated bundled packet. In addition, the controller 821 may have a logical function of performing control such as radio resource control, radio bearer control, mobility management, admission control, scheduling, or the like. Furthermore, the control may be performed in cooperation with a nearby eNB or a core network node. The memory 822 includes a RAM and a ROM, and stores a program executed by the controller 821 and a variety of control data (such as, for example, a terminals list, transmission power data, and scheduling data).

The network interface 823 is a communication interface for connecting the base station device 820 to the core network 824. The controller 821 may communicate with a core network node or another eNB via the network interface 823. In this case, the eNB 800 may be connected to the core network node or the other eNB through a logical interface (for example, S1 interface or X2 interface). The network interface 823 may be a wired communication interface or a wireless communication interface for wireless backhaul. In a case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may perform, for example, encoding/decoding, modulation/demodulation, multiplexing/demultiplexing, and the like, and performs a variety of signal processing on each layer (for example, L1, medium access control (MAC), radio link control (RLC), and packet data convergence protocol (PDCP)). In place of the controller 821, the BB processor 826 may have some or all of the logical functions described above. The BB processor 826 may be a module including a memory that stores a communication control program, a processor that executes the program, and a related circuit, and the function of the BB processor 826 may be changeable through an update of the program. Furthermore, the module may be a card or blade inserted into a slot on the base station device 820, or may be a chip mounted on the card or blade. Meanwhile, the RF circuit 827 may include a mixer, a filter, an amplifier, and the like, and transmits and receives a wireless signal via the antenna 810.

The wireless communication interface 825 includes a plurality of the BB processors 826 as illustrated in FIG. 15, and the plurality of BB processors 826 may, for example, respectively correspond to a plurality of frequency bands used by the eNB 800. Furthermore, the wireless communication interface 825 includes a plurality of the RF circuits 827 as illustrated in FIG. 15, and the plurality of RF circuits 827 may, for example, respectively correspond to a plurality of antenna elements. Note that while FIG. 15 illustrates an example in which the wireless communication interface 825 includes a plurality of the BB processors 826 and a plurality of the RF circuits 827, the wireless communication interface 825 may include a single BB processor 826 or a single RF circuit 827.

In the eNB 800 illustrated in FIG. 15, the higher layer processing unit 101, the control unit 103, the receiving unit 105, and/or the transmitting unit 107 described with reference to FIG. 7 may be implemented in the wireless communication interface 825 (for example, the BB processor 826 and/or the RF circuit 827), the controller 821, and/or the network interface 823. For example, the wireless communication interface 825, the controller 821, and/or the network interface 823 may transmit first control information and second control information, receive a request for control information, and transmit third control information corresponding to the request. For example, a function for performing these operations may be implemented in a processor included in the wireless communication interface 825. As a device that performs such operations, the eNB 800, the base station device 820, or the aforementioned module may be provided, or a program for causing the processor to perform these operations may be provided. Furthermore, a readable recording medium in which the program is recorded may be provided. Furthermore, the transceiver antenna 109 may be implemented in the antenna 810.

Second Application Example

Figure 16:
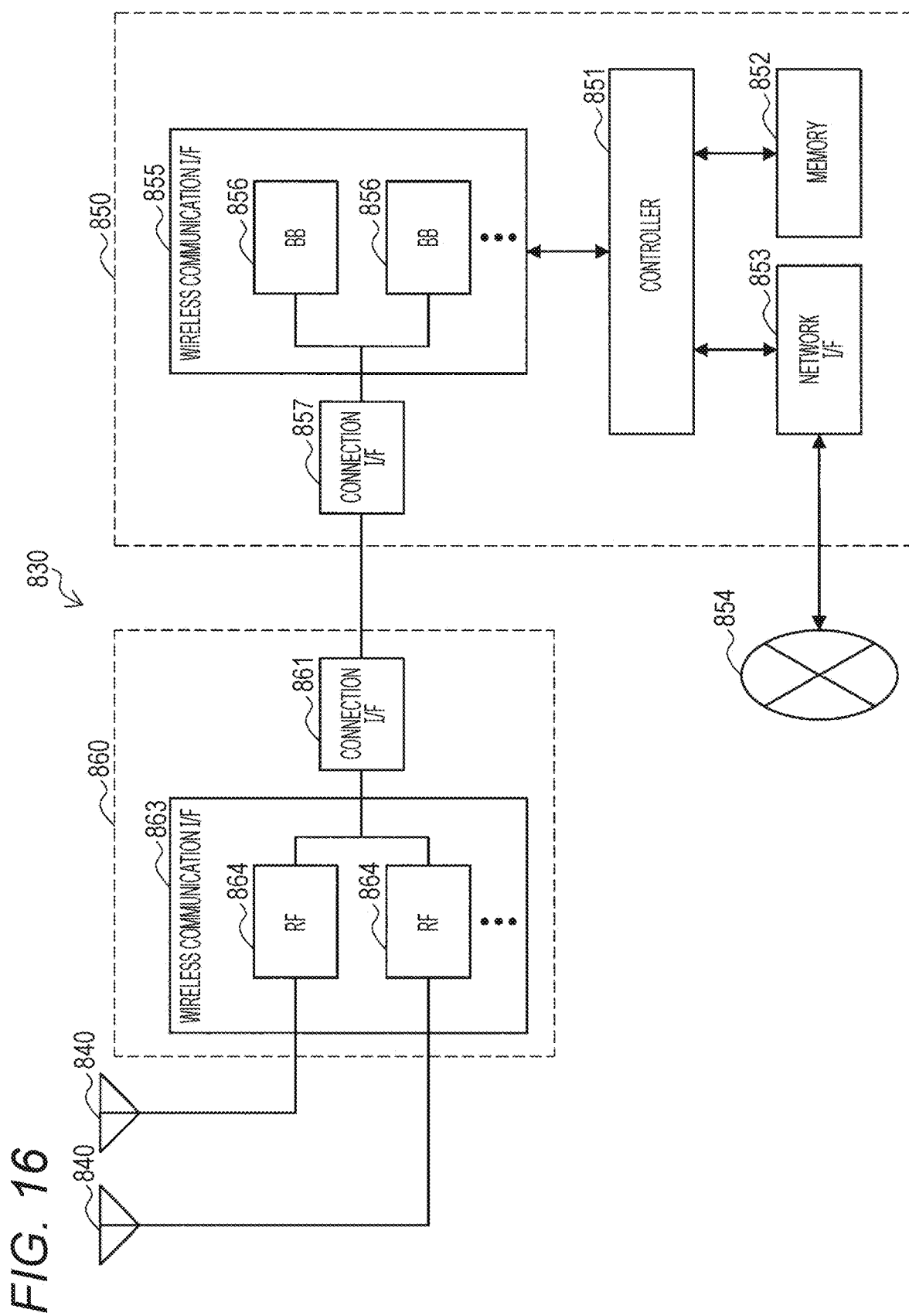
FIG. 16 is a block diagram illustrating a second example of a general configuration of an eNB to which the technology according to the present disclosure can be applied.

FIG. 16 is a block diagram illustrating a second example of a general configuration of an eNB to which the technology according to the present disclosure can be applied. An eNB 830 includes one or more antennas 840, a base station device 850, and an RRH 860. Each antenna 840 and the RRH 860 may be connected to each other via an RF cable. Furthermore, the base station device 850 and the RRH 860 may be connected to each other by a high speed line such as an optical fiber cable.

Each of the antennas 840 includes a single or a plurality of antenna elements (for example, a plurality of antenna elements included in a MIMO antenna) and is used for the RRH 860 to transmit and receive a wireless signal. The eNB 830 may include a plurality of the antennas 840 as illustrated in FIG. 27, and the plurality of antennas 840 may, for example, respectively correspond to a plurality of frequency bands used by the eNB 830. Note that while FIG. 16 illustrates an example in which the eNB 830 includes a plurality of antennas 840, the eNB 830 may include a single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 15.

The wireless communication interface 855 supports a cellular communication system such as LTE or LTE-Advanced, and provides wireless connection to a terminal located in a sector corresponding to the RRH 860 via the RRH 860 and the antenna 840. The wireless communication interface 855 may typically include a BB processor 856. The BB processor 856 is similar to the BB processor 826 described with reference to FIG. 15 except that the BB processor 856 is connected to an RF circuit 864 of the RRH 860 via the connection interface 857. The wireless communication interface 855 includes a plurality of the BB processors 856 as illustrated in FIG. 16, and the plurality of BB processors 856 may, for example, respectively correspond to a plurality of frequency bands used by the eNB 830. Note that while FIG. 16 illustrates an example in which the wireless communication interface 855 includes a plurality of the BB processors 856, the wireless communication interface 855 may include a single BB processor 856.

The connection interface 857 is an interface for connecting the base station device 850 (wireless communication interface 855) to the RRH 860. The connection interface 857 may be a communication module for communication on the high speed line which connects the base station device 850 (wireless communication interface 855) to the RRH 860.

Furthermore, the RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include an RF circuit 864 and the like. The RF circuit 864 may include a mixer, a filter, an amplifier, and the like, and transmits and receives a wireless signal via the antenna 840. The wireless communication interface 863 includes a plurality of the RF circuits 864 as illustrated in FIG. 16, and the plurality of RF circuits 864 may, for example, respectively correspond to a plurality of antenna elements. Note that while FIG. 16 illustrates an example in which the wireless communication interface 863 includes a plurality of the RF circuits 864, the wireless communication interface 863 may include a single RF circuit 864.

In the eNB 830 illustrated in FIG. 16, the higher layer processing unit 101, the control unit 103, the receiving unit 105 and/or the transmitting unit 107 described with reference to FIG. 7 may be implemented in the wireless communication interface 855, the wireless communication interface 863 (for example, the BB processor 856 and/or the RF circuit 864), the controller 851, and/or the network interface 853. For example, the wireless communication interface 855, the wireless communication interface 863, the controller 851, and/or the network interface 853 may transmit first control information and second control information, receive a request for control information, and transmit third control information corresponding to the request. For example, a function for performing these operations may be implemented in a processor included in the wireless communication interface 855 and/or the wireless communication interface 863. As a device that performs such operations, the eNB 830, the base station device 850, or the aforementioned module may be provided, or a program for causing the processor to perform these operations may be provided. Furthermore, a readable recording medium in which the program is recorded may be provided. Furthermore, the transceiver antenna 109 may be implemented in the antenna 840.

Note that the eNB shown in the above description may be a gNB (gNodeB or next generation Node B).

6. CONCLUSION

As described above, the present disclosure makes it possible to improve transmission efficiency in a wireless communication system in which a base station device and a communication device communicate with each other.

Process steps carried out by the individual devices described herein may not necessarily be performed in time series following the order shown in the sequence diagram or flowchart. For example, process steps carried out by the individual devices may be performed in an order different from the order illustrated in the flowchart, or may be performed in parallel.

Furthermore, a program can be created such that the hardware built in each device, such as a CPU, a ROM, and a RAM, is caused to fulfill functions equivalent to the functions of the individual devices described above. Furthermore, it is also possible to provide a storage medium storing the computer program. Furthermore, it is also possible to implement a series of processes in hardware by configuring each of the functional blocks illustrated in the functional block diagrams with hardware.

Preferred embodiments of the present disclosure have been described above in detail with reference to the accompanying drawings, but the technical scope of the present disclosure is not limited to these examples. It is apparent that a person having ordinary knowledge in the technical field of the present disclosure can arrive at various changes or modifications within the scope of the technical idea described in the claims, and it is naturally understood that these changes and modifications belong to the technical scope of the present disclosure.

Furthermore, the effects described herein are merely illustrative or exemplary effects, and are not restrictive. That is, in addition to or in place of the effects described above, the technology according to the present disclosure can provide other effects that are obvious to those skilled in the art from the descriptions herein.

Note that the following configurations also belong to the technical scope of the present disclosure.

(1)

A communication device configured to be capable of floating in air, the communication device including:

a control unit that receives information regarding interference with a first communication device from a second communication device, the first communication device being not a communication partner, the second communication device being the communication partner, and controls transmission on the basis of the information regarding the interference and of an altitude of the communication device.

(2)

The communication device according to (1), in which the interference is inter-cell interference resulting from a signal transmitted by the communication device.

(3)

The communication device according to (1) or (2), in which the control unit controls transmission power on the basis of the information and of the altitude of the communication device.

(4)

The communication device according to (3), in which the control unit calculates the transmission power by multiplying path loss with respect to the second communication device by a coefficient that employs a function regarding altitude.

(5)

The communication device according to (1) or (2), in which the control unit controls a transmission beamform on the basis of the information and of the altitude of the communication device.

(6)

The communication device according to (5), in which the information regarding the interference includes information regarding a beamform resulting from the interference with the first communication device.

(7)

The communication device according to (1) or (2), in which the control unit switches resources for transmission on the basis of the information and of the altitude of the communication device.

(8)

The communication device according to (1) or (2), in which the control unit controls the transmission on the basis of an altitude difference between the second communication device and the communication device.

(9)

A communication device including:

a communication unit that receives information regarding interference caused by a first communication device with a second communication device from the second communication device, the first communication device being a communication partner and being configured to be capable of floating, and transmits the information regarding the interference to the first communication device, in which the information regarding the interference includes information regarding a beamform resulting from the interference caused by the first communication device with the second communication device.

(10)

A communication control method for a communication device configured to be capable of floating in air, the communication control method including:

receiving information regarding interference with a first communication device from a second communication device, the first communication device being not a communication partner, the second communication device being the communication partner; and controlling transmission on the basis of the information regarding the interference and of an altitude of the communication device.

(11)

A communication control method including:

receiving information regarding interference caused by a first communication device with a second communication device from the second communication device, the first communication device being a communication partner and being configured to be capable of floating; and transmitting the information regarding the interference to the first communication device, in which the information regarding the interference includes information regarding a beamform resulting from the interference caused by the first communication device with the second communication device.

(12)

A computer program executed on a communication device configured to be capable of floating in air, the computer program causing to execute:

receiving information regarding interference with a first communication device from a second communication device, the first communication device being not a communication partner, the second communication device being the communication partner; and controlling transmission on the basis of the information regarding the interference and of an altitude of the communication device.

(13)

A computer program causing a computer to execute:

receiving information regarding interference caused by a first communication device with a second communication device from the second communication device, the first communication device being a communication partner and being configured to be capable of floating; and transmitting the information regarding the interference to the first communication device, in which the information regarding the interference includes information regarding a beamform resulting from the interference caused by the first communication device with the second communication device.

REFERENCE SIGNS LIST

100 Base station device
101 Higher layer processing unit
103 Control unit
105 Receiving unit
1051 Decoding unit
1053 Demodulating unit
1055 Demultiplexing unit
1057 Wireless receiving unit
1059 Channel measuring unit
107 Transmitting unit
1071 Encoding unit
1073 Modulating unit
1075 Multiplexing unit
1077 Wireless transmitting unit
1079 Downlink reference signal generating unit
109 Transceiver antenna
110 Setting unit
120 Selecting unit
130 Message transmitting/receiving unit
200 Terminal device
201 Higher layer processing unit
203 Control unit
205 Receiving unit
2051 Decoding unit
2053 Demodulating unit
2055 Demultiplexing unit
2057 Wireless receiving unit
2059 Channel measuring unit
207 Transmitting unit
2071 Encoding unit
2073 Modulating unit
2075 Multiplexing unit
2077 Wireless transmitting unit
2079 Uplink reference signal generating unit
209 Transceiver antenna
210 Selecting unit
220 Message transmitting/receiving unit

The invention claimed is:

1. A communication device configured to be capable of floating in air, the communication device comprising:

a controller configured to receive control information regarding interference with a first base station device from a second base station device, the first base station device not being a communication partner, the second base station device being the communication partner, and to control transmission on a basis of the control information regarding the interference and of an altitude of the communication device, wherein the first base station device acquires an interference signal from the communication device and transmits interference information to the second base station device and wherein the second base station device calculates uplink transmission beamforming for the communication device based on the interference information received from the first base station and transmits to the communication device a result of calculating the uplink transmission beamforming as the control information.

2. The communication device according to claim 1, wherein the interference is inter-cell interference resulting from a signal transmitted by the communication device.

3. The communication device according to claim 1, wherein the controller is configured to control transmission power on the basis of the control information and of the altitude of the communication device.

4. The communication device according to claim 3, wherein the controller is configured to calculate the transmission power by multiplying path loss with respect to the second base station device by a coefficient that employs a function regarding altitude.

5. The communication device according to claim 1, wherein the controller is configured to control a transmission beamform on the basis of the control information and of the altitude of the communication device.

6. The communication device according to claim 5, wherein the control information regarding the interference includes information regarding a beamform resulting from the interference with the first base station device.

7. The communication device according to claim 1, wherein the controller is configured to switch resources for transmission on the basis of the control information and of the altitude of the communication device.

8. The communication device according to claim 1, wherein the controller is configured to control the transmission on a basis of an altitude difference between the second base station device and the communication device.

9. A communication control method for a communication device configured to be capable of floating in air, the communication control method comprising:
receiving control information regarding interference with a first base station device from a second base station device, the first base station device not being a communication partner, the second base station device being the communication partner; and
controlling transmission on a basis of the control information regarding the interference and of an altitude of the communication device, wherein the first base station device acquires an interference signal from the communication device and transmits interference information to the second base station device and wherein the second base station device calculates uplink transmission beamforming for the communication device based on the interference information received from the first base station and transmits to the communication device a result of calculating the uplink transmission beamforming as the control information.

10. A non-transitory computer readable medium storing instructions that, when executed by processing circuitry on a communication device configured to be capable of floating in air, perform a method comprising:
receiving control information regarding interference with a first base station device from a second base station device, the first base station device not being a communication partner, the second base station device being the communication partner; and
controlling transmission on a basis of the control information regarding the interference and of an altitude of the communication device, wherein the first base station device acquires an interference signal from the communication device and transmits interference information to the second base station device and wherein the second base station device calculates uplink transmission beamforming for the communication device based on the interference information received from the first base station and transmits to the communication device a result of calculating the uplink transmission beamforming as the control information.

* * * * *